(12) United States Patent
Sinha et al.

(10) Patent No.: US 11,308,775 B1
(45) Date of Patent: Apr. 19, 2022

(54) MONITORING AND TRACKING INTERACTIONS WITH INVENTORY IN A RETAIL ENVIRONMENT

(71) Applicant: SAI GROUP LIMITED, London (GB)

(72) Inventors: Somnath Sinha, London (GB); Abhijit Sanyal, West Bengal (IN)

(73) Assignee: SAI GROUP LIMITED, London (GB)

( * ) Notice: Subject to any disclaimer, the term of this patent is extended or adjusted under 35 U.S.C. 154(b) by 0 days.

(21) Appl. No.: 17/401,498

(22) Filed: Aug. 13, 2021

(51) Int. Cl.
| | |
|---|---|
| *G08B 13/196* | (2006.01) |
| *G06K 9/62* | (2022.01) |
| *G06Q 10/08* | (2012.01) |
| *G06N 3/08* | (2006.01) |
| *G06V 20/40* | (2022.01) |
| *G06V 20/52* | (2022.01) |
| *G06V 40/20* | (2022.01) |

(52) U.S. Cl.
CPC ....... *G08B 13/19608* (2013.01); *G06K 9/628* (2013.01); *G06N 3/08* (2013.01); *G06Q 10/087* (2013.01); *G06V 20/46* (2022.01); *G06V 20/52* (2022.01); *G06V 40/23* (2022.01); *G06T 2207/10016* (2013.01); *G06T 2207/20084* (2013.01); *G06T 2207/30232* (2013.01); *G06T 2207/30242* (2013.01)

(58) Field of Classification Search
None
See application file for complete search history.

(56) References Cited

U.S. PATENT DOCUMENTS

| | | |
|---|---|---|
| 5,965,861 A | 10/1999 | Addy et al. |
| 7,516,888 B1 | 4/2009 | Kundu et al. |
| 7,631,808 B2 | 12/2009 | Kundu et al. |
| 8,564,661 B2 | 10/2013 | Lipton et al. |
| 9,036,028 B2 | 5/2015 | Buehler |
| 9,158,975 B2 | 10/2015 | Lipton et al. |
| 9,473,747 B2 | 10/2016 | Kobres et al. |
| 10,064,502 B1 | 9/2018 | Gyori et al. |
| 10,266,196 B1 | 4/2019 | Sinha |
| 10,268,983 B2 | 4/2019 | Kumar et al. |
| 10,950,099 B1 | 3/2021 | Schoner |
| 10,956,721 B2 | 3/2021 | Tusch |
| 2002/0113123 A1 | 8/2002 | Otto et al. |
| 2003/0040925 A1 | 2/2003 | Gutta et al. |
| 2004/0130620 A1 | 7/2004 | Buehler et al. |
| 2008/0019589 A1 | 1/2008 | Yoon et al. |
| 2010/0014717 A1 | 1/2010 | Rosenkrantz |
| 2012/0320199 A1 | 12/2012 | Kundu et al. |

(Continued)

OTHER PUBLICATIONS

Office Action in U.S. Appl. No. 17/401,494 dated Dec. 6, 2021, 32 pages.

*Primary Examiner* — Leon Flores
(74) *Attorney, Agent, or Firm* — Marshall, Gerstein & Borun LLP

(57) ABSTRACT

Methods and systems monitor activity in a retail environment, such as activity in a display area (e.g., aisle) of the retail environment. A convolutional neural network is used to detect objects (e.g., inventory items) or events (e.g., instances of people picking up inventory items from shelves). Various algorithms may be used to determine whether suspicious activity occurs, and/or to determine whether to trigger alerts. Monitored/detected activity may be stored in a database to facilitate a deeper understanding of operations within the retail environment.

24 Claims, 11 Drawing Sheets

(56) References Cited

U.S. PATENT DOCUMENTS

| | | |
|---|---|---|
| 2014/0014722 A1 | 1/2014 | Goncalves et al. |
| 2014/0161316 A1 | 6/2014 | Golan et al. |
| 2014/0226855 A1 | 8/2014 | Sawides et al. |
| 2014/0368626 A1 | 12/2014 | John Archibald et al. |
| 2015/0012396 A1 | 1/2015 | Puerini et al. |
| 2017/0169297 A1 | 6/2017 | Bernal et al. |
| 2017/0318140 A1 | 11/2017 | Sinha et al. |
| 2019/0205643 A1* | 7/2019 | Liu .......................... G06T 7/73 |
| 2020/0151692 A1 | 5/2020 | Gao et al. |
| 2020/0302510 A1 | 9/2020 | Chachek et al. |
| 2021/0217017 A1 | 7/2021 | Scott et al. |

\* cited by examiner

MONITORING AND TRACKING INTERACTIONS WITH INVENTORY IN A RETAIL ENVIRONMENT

FIELD OF THE DISCLOSURE

The present disclosure generally relates to retail environments and, more specifically, to technologies for monitoring and tracking interactions with inventory in such environments.

BACKGROUND

In retail environments such as grocery stores, hardware stores, book stores, etc., various people (e.g., customers and employees) typically interact with a large number of different objects (e.g., inventory items, checkout scanning equipment, store-supplied conveyances such as trolleys or baskets, etc.) at any given point in time. Typically, customers enter a retail environment with various types of personal belonging (e.g., purses, smartphones, walkers, etc.), grab a trolley or basket, and then move around and pick up items from display shelves. As is well known, theft (shoplifting) can be a common occurrence in these settings. To combat such theft, stores often have to hire security personnel, and/or lose productivity due to other personnel (e.g., store managers or others) personally observing customers, either directly or via installed camera systems (e.g., closed-circuit television or "CCTV" systems). To lower the cost and improve the reliability of theft monitoring and prevention, some have proposed systems and software that automatically alert store personnel to potential theft events. Unfortunately, these systems/software tend to be inadequate due to two factors: (1) the high complexity of the retail environment, and (2) the high costs and other barriers associated with installing numerous and/or high-quality sensors (e.g., cameras) in the retail environment.

With respect to complexity, aside from the sheer number of customers to be monitored (in some cases), the interactions between customers and inventory items can vary in many ways. For example, some customers may place items in their store-supplied trolleys/carts or baskets before proceeding to the checkout area, while others may pick up and inspect items only to return them to the display area (or a different display area) rather than purchasing them. Moreover, some customers may use their own conveyances (e.g., a purse or other personal bag, a pocket, etc.) to hold items, or may simply hold the items in their hands, etc. While some of these latter customers might be attempting to steal the items, others might have a more innocuous purpose, such as showing an item to a companion or holding/carrying the item until they arrive at the checkout area. Various other factors can also make the retail environment more complex. For example, some people within the store who handle inventory items are employees rather than customers. As another example, and in addition to changes in inventory levels in the display areas (e.g., the number items stocked in shelves along store aisles), the structure or arrangement of the display areas may themselves change over time (e.g., if an employee reconfigures a shelving arrangement).

With respect to high costs and other barriers to installing numerous and/or high-quality sensors, it is not financially feasible for most stores to move beyond the (often quite old) CCTV systems that those stores already have in place. These CCTV systems tend to have limited camera placement (rather than full-store coverage), and produce low-quality (e.g., low resolution) images. Typically, for example, it is impossible to discern from a CCTV video feed exactly which inventory items customers are picking up, or the number of inventory items those customers are picking up.

Given the complexity of the retail environment and the low quality of most sensing systems, proposed techniques that might otherwise provide high-precision security monitoring are generally impracticable. Moreover, systems or procedures that aspire to track metrics/events in a retail environment for other purposes (e.g., for marketing, or for more efficient display area design, etc.) are similarly limited by the complexity of the environment and the shortcomings of the sensing systems. Thus, there is a need for systems, methods, and techniques that can provide robust monitoring/tracking in retail environments even when using low-quality sensors such as existing CCTV systems.

BRIEF SUMMARY

In one aspect, a method of monitoring checkout activity in a retail environment includes: (1) receiving, by one or more processors of a computing system, a time series of video frames depicting an area of interest in the retail environment, wherein checkout scanning equipment is located in the area of interest; (2) detecting, by the one or more processors and using a convolutional neural network to process the time series of video frames, inventory items in the area of interest, wherein detecting the inventory items in the area of interest includes removing, from each video frame of the time series, background components that depict the checkout scanning equipment; (3) determining, by the one or more processors and for each detected inventory item in the area of interest, whether a valid checkout procedure was followed; and (4) causing, by the one or more processors, information indicating whether the valid checkout procedure was followed for each detected inventory item in the area of interest to be stored and/or displayed.

In another aspect, a computing system includes one or more processors and memory. The memory stores instructions that, when executed by the one or more processors, cause the computing system to: (1) receive a time series of video frames depicting an area of interest in a retail environment, wherein checkout scanning equipment is located in the area of interest; (2) detect, using a convolutional neural network to process the time series of video frames, inventory items in the area of interest, wherein detecting the inventory items in the area of interest includes removing, from each video frame of the time series, background components that depict the checkout scanning equipment; (3) determine, for each detected inventory item in the area of interest, whether a valid checkout procedure was followed; and (4) cause information indicating whether the valid checkout procedure was followed for each detected inventory item in the area of interest to be stored and/or displayed.

In another aspect, a method of monitoring a display area for inventory items in a retail environment includes: (1) receiving, by one or more processors of a computing system, a time series of video frames depicting an area of interest in the retail environment, wherein the display area is located in the area of interest; (2) detecting, by the one or more processors and using a convolutional neural network to process the time series of video frames, instances of people picking up inventory items from the display area; (3) for each instance of detecting a person picking up one or more inventory items from the display area, determining, by the one or more processors and using the convolutional neural network, additional information including (i) a type of inventory item that the person picked up and (ii) a count of how many inventory items the person picked up; (4) causing the additional information to be stored in a database; and (5) causing, by the one or more processors and based at least in part on the detected instances of people picking up inventory items from the display area, one or more alert messages to be displayed.

In another aspect, a computing system includes one or more processors and memory. The memory stores instructions that, when executed by the one or more processors, cause the computing system to: (1) receive a time series of video frames depicting an area of interest in a retail environment, wherein a display area is located in the area of interest; (2) detect, using a convolutional neural network to process the time series of video frames, instances of people picking up inventory items from the display area; (3) for each instance of detecting a person picking up one or more inventory items from the display area, determine, using the convolutional neural network, additional information including (i) a type of inventory item that the person picked up and (ii) a count of how many inventory items the person picked up; (4) cause the additional information to be stored in a database; and (5) cause, based at least in part on the detected instances of people picking up inventory items from the display area, one or more alert messages to be displayed.

BRIEF DESCRIPTION OF THE DRAWINGS

The figures described below depict various aspects of the systems and methods disclosed herein. It should be understood that each figure depicts an embodiment of a particular aspect of the disclosed system and methods, and that each of the figures is intended to accord with a possible embodiment thereof.

DETAILED DESCRIPTION

I. Overview

The embodiments described herein relate to, inter alia, systems, methods, and techniques for detecting, classifying, and/or creating a digital record of interactions/events in a retail environment in an ongoing (e.g., continuous) manner. In various implementations, monitoring/tracking of the interactions/events is used to generate security/theft alerts, and/or to enable retailers or others to better and more deeply understand how their sites are operating (e.g., how many customers are not paying for their goods, how many customers are picking up items but replacing them rather than purchasing them, etc.).

II. Example Retail Environment Monitoring and Tracking System

Figure 1:
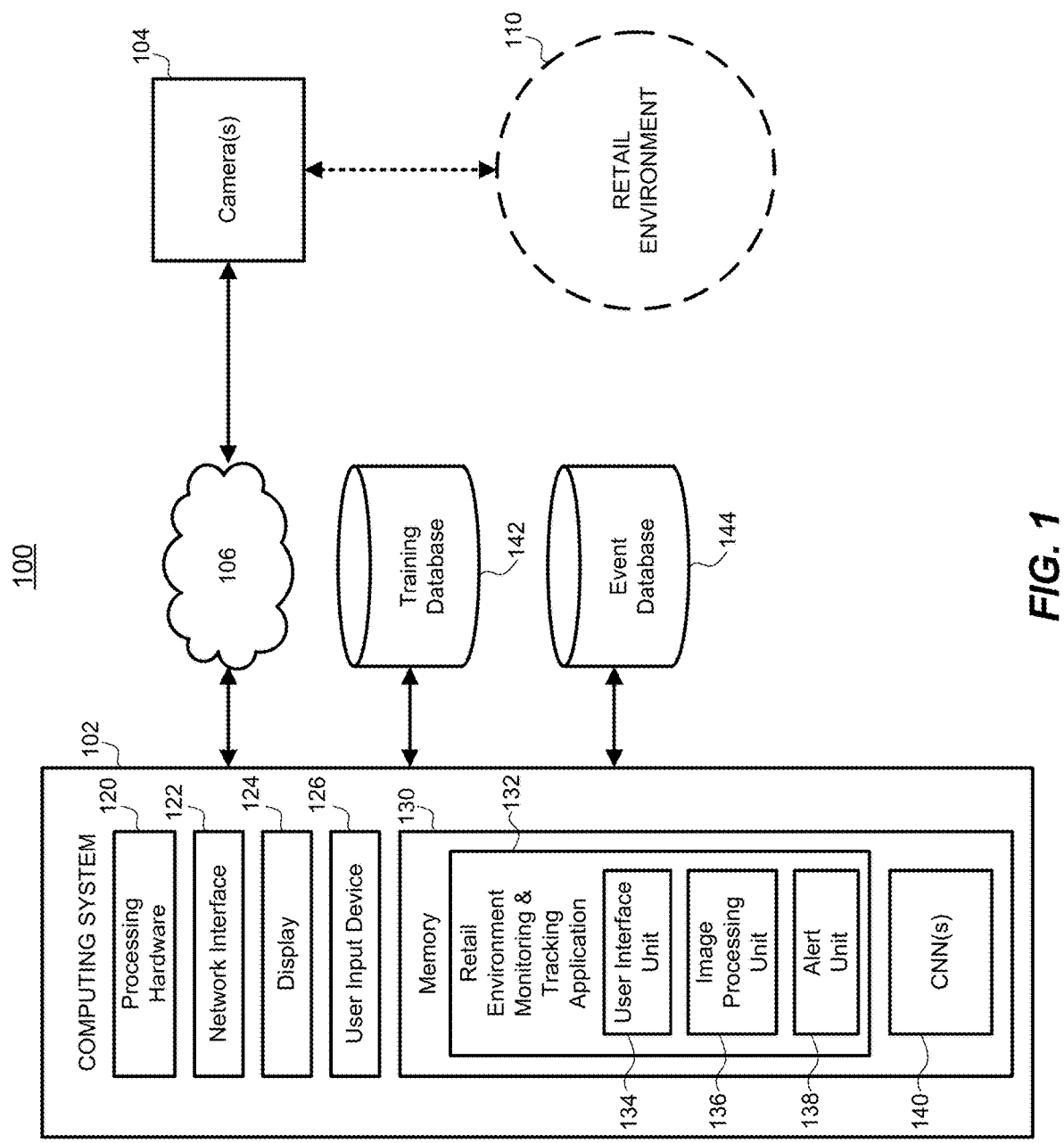
FIG. 1 is a simplified block diagram of an example system that may be used to implement one or more techniques of the present disclosure.

FIG. 1 is a simplified block diagram of an example system 100 that may be used to implement one or more techniques of the present disclosure. The example system 100 includes a computing system 102 communicatively coupled to one or more cameras 104 via a network 106. The network 106 may be a single communication network, or may include multiple communication networks of one or more types (e.g., one or more wired and/or wireless personal or local area networks (PANs or LANs), and/or one or more wide area networks (WANs) such as the Internet if the computing system 102 includes a remote server). The camera(s) 104 are arranged so as to sense/image one or more portions of a retail environment 110.

The retail environment 110 may be any type of store or other establishment that displays merchandise for sale (e.g., a grocery store, gas station, hardware store, etc.), and may include indoor and/or outdoor areas (e.g., a grocery store with food items displayed inside and propane and ice bags outside, or an outdoor market with booths/stations, etc.). The camera(s) 104 may include cameras within the retail environment 110 (e.g., mounted on ceilings above grocery store aisles and checkout stations), and/or cameras outside the retail environment 110 (e.g., mounted on light poles in a parking lot outside the retail environment 110, and facing the retail environment 110). The camera(s) 104 include, or are communicatively coupled to, hardware configured to communicate the captured images (e.g., a video feed) to the computing system 102 via the network 106. The camera(s) 104 may be part of a CCTV system that includes analog or digital cameras, for example. In other embodiments, the camera(s) 104 may also, or instead, include one or more other types of imaging sensors, such as lidar sensors, infrared sensors, and so on. As discussed below, however, many of the techniques described herein are particularly well suited for use cases where only relatively low-cost, low-quality cameras are available for use.

The computing system 102 may be in or near the retail environment 110 (e.g., a server, desktop computer, laptop computer, or tablet computer, owned by a proprietor of a store that comprises the retail environment 110), or may be remote from the retail environment 110 (e.g., a web server of a company providing a commercial service to the proprietor of the store). The computing system 102 may be a single computing device, or a collection of distributed (i.e., communicatively coupled local and/or remote) computing devices and/or systems, depending on the embodiment.

The computing system 102 includes processing hardware 120, a network interface 122, a display 124, a user input device 126, and memory 130. The processing hardware 120 includes one or more processors, each of which may be a programmable microprocessor that executes software instructions stored in the memory 130 to execute some or all of the functions of the computing system 102 as described herein. The processing hardware 120 may include one or more central processing units (CPUs) and/or one or more graphics processing units (GPUs), for example. In some embodiments, however, a subset consisting of one or more of the processors in the processing hardware 120 may include processors that do not execute software instructions (e.g., application-specific integrated circuits (ASICs), field-programmable gate arrays (FPGAs), etc.).

The network interface 122 may include any suitable hardware (e.g., front-end transmitter and receiver hardware), firmware, and/or software configured to use one or more communication protocols to communicate with external devices and/or systems (including at least the camera(s) 104) via the network 106. For example, the network interface 122 may be or include an IEEE 802.11 WLAN or Ethernet interface.

The display 124 may use any suitable display technology (e.g., LED, OLED, LCD, etc.) to present information to a user, and the user input device 126 may include a keyboard, mouse, microphone, and/or any other suitable input device or devices to enable user inputs to the computing system 102. In some embodiments, the display 124 and the user input device 126 are at least partially integrated within a single device (e.g., a touchscreen display). Generally, the display 124 and the user input device 126 may collectively enable a user to view and/or interact with visual presentations (e.g., graphical user interfaces, alert messages, video feeds from the camera(s) 104, and/or other information) output by the computing system 102.

The memory 130 may include one or more volatile and/or non-volatile memories. Any suitable memory type or types may be included in the memory 130, such as a read-only memory (ROM) and/or a random access memory (RAM), a flash memory, a solid-state drive (SSD), a hard disk drive (HDD), and so on. Collectively, the memory 130 may store the instructions of one or more software applications, the data received/used by those applications, and the data output/generated by those applications. In the example system 100, the memory 130 stores the software instructions of a retail environment monitoring and tracking application 132, also referred to herein as "REMT application 132."

The example REMT application 132 of FIG. 1 includes a user interface unit 134, an image processing unit 136, and an alert unit 138. Generally, the user interface unit 134 enables user interaction with the REMT application 132 (e.g., to initially configure operation of the computing system 102 and/or REMT application 132), the image processing unit 136 processes video frames from the camera(s) 104 for object recognition and other purposes, and the alert unit 138 generates and/or triggers alert messages (and/or audio alerts) based on the outputs of the image processing unit 136. To perform object recognition tasks (e.g., object classification and possibly other tasks, such as object localization), the image processing unit 136 utilizes one or more convolutional neural networks (CNNs) 140 stored in the memory 130. Each CNN 140 can include convolution, pooling, flattening, and fully connected layers, for example. In some embodiments, a single CNN 140 may include hundreds or thousands of layers, and tens of thousands or hundreds of thousands of neurons, for example.

In some embodiments, the image processing unit 136 uses a different one of CNNs 140 for each of two or more different use cases (e.g., the checkout area application and display area application discussed in further detail below). In other embodiments, the memory 130 stores separate applications for the different use cases. In still other embodiments, the computing system 102 only supports a single use case (e.g., only the checkout area application or only the display area application).

In some embodiments, the computing system 102 is communicatively coupled to, or includes (e.g., in the memory 130), a training database 142 and an event database 144. The training database 142 includes images (e.g., video frames), and corresponding labels, that the computing system 102 (or another computing system not shown in FIG. 1) may use to train the CNN(s) 140. A small set of example images/frames are shown in FIGS. 4A-4C and 7A-7C, discussed below. The labels are manually-generated labels that classify corresponding images or image portions according to one of the classes that the respective one of CNN(s) 140 is being trained to recognize (e.g., "hand," "item," or "empty," as discussed in further detail below for a checkout area application).

The event database 144 includes a digital record of events, in the retail environment 110, that are detected or inferred by the computing system 102 when executing the REMT application 132. In some embodiments, for example, the REMT application 132 may add every classification made by the image processing unit 136 (or every classification within a certain subset of classes, etc.), and a corresponding time stamp, to the event database 144. In some embodiments, the REMT application 132 also adds other information to the event database 144, such as outputs of one or more additional algorithms (e.g., outputs of algorithms indicating whether the motion of an item corresponded to a valid scan, outputs of a higher-level algorithm that is implemented by the alert unit 138 and determines whether outputs of the image processing unit 136 are indicative of a theft attempt, etc.), and corresponding time stamps. Any other type of information described herein (e.g., any output of any component of the REMT application 132) may also be stored in the event database 144. In some embodiments, the event database 144 stores each and every monitored item and interaction (e.g., customer/item interaction) in a relational or graph database.

By maintaining a rich database, retailers, marketing departments/firms, and/or other entities may better understand how retail locations are operating and being used by customers. In some embodiments, however, the event database 144 itself does not attempt to indicate transactions (e.g., thefts and purchases), but rather just the underlying transactions from which transactions and/or other higher-level events may be inferred/determined. For example, a software application with access to the event database 144 may identify theft events by identifying all interactions in which a particular person picks up an inventory item, but then discarding the interactions in which the person subsequently purchased the item or returned the item to the store shelf. In general, software applications may access the event database 144 to generate any desired metrics, such as how many times customers inspected particular items without buying them, how many times customers returned items to shelves on which the items do not belong, and so on.

The databases 142, 144 may be single or distributed databases, and may be stored in one memory or distributed across multiple memories and/or systems. In some embodiments, the training database 142 and/or the event database 144 is directly accessed by a server that is remote from (and communicatively coupled to) the computing system 102. For example, the training database 142 may be remote, and may be directly accessed via a server that trains the CNN(s) 140 and before providing the trained CNN(s) 140 to the computing system 102.

Figure 2:
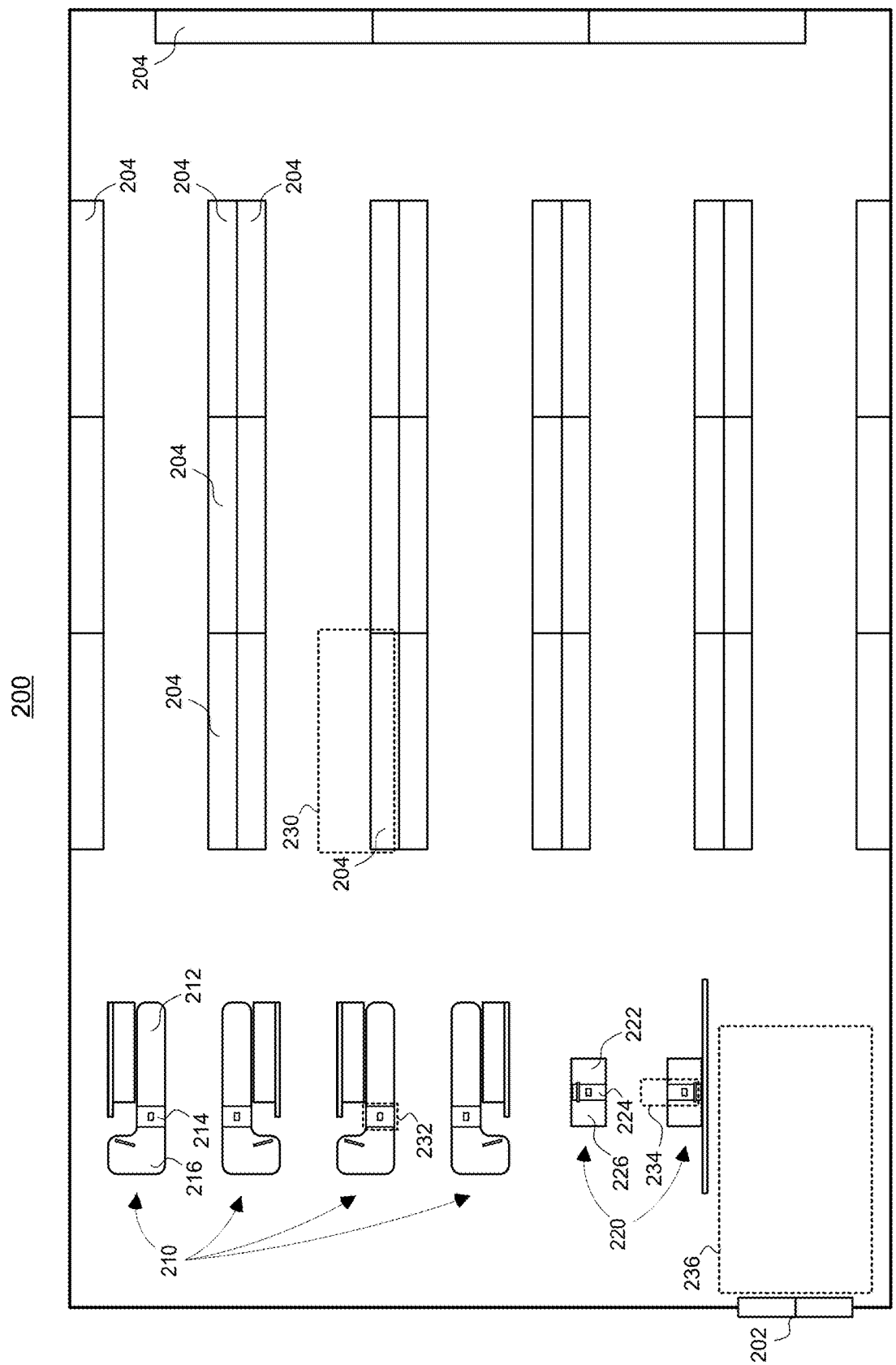
FIG. 2 is a simplified diagram of an example store with example areas of interest.

One example of the retail environment 110 is shown in FIG. 2 as a store 200. It is understood that the retail environment 110 may be any sort of indoor and/or outdoor space in which retail activity can occur, and that the store 200 is shown merely as a reference for certain examples below.

In the store 200, an entry/exit 202 allows customers to enter and exit the store 200, and a number of display areas 204 (only a subset of which are numbered/labeled in FIG. 2, for clarity) include shelving and/or other structures that allow customers to see and access (pick up) inventory items (e.g., food and/or other products). In the example shown, the display areas 204 are arranged so as to form aisles of a sort that are common in retail stores.

The store 200 also includes four employee checkout stations 210 at which store employees scan items for customers (and possibly bag those items as well). Each employee checkout station 210, in this example, includes a loading area 212 (e.g., having a conveyor to move items towards the employee), checkout scanning equipment 214 the employee uses to scan each item, and a pick-up area 216 from which customers can pick up their items after paying for those items. The checkout scanning equipment 214 may have a flat top surface with an optically transparent window over which the employee passes each item's barcode or QR code in order to scan the item. In other embodiments, the checkout scanning equipment 214 is, or includes, a handheld barcode or QR code scanner. The checkout scanning equipment 214 (i.e., the scanner itself, and possibly software executing on a computing device coupled to the scanner) is configured to generate output data indicative of which item was scanned (e.g., by decoding the barcode or QR code, and then accessing a database to identify which product corresponds to that barcode or QR code), possibly with a time stamp. In some embodiments, such data is provided to the computer system 102 for storage in the event database 144, and/or for use by the alert unit 138 as discussed below).

The store 200 also includes two self-checkout stations 220 at which customers can scan their own items, with or without some level of supervision by store security personnel. Each self-checkout station 220 includes a loading area 222, checkout scanning equipment 224, and a pick-up area 226, which may be similar to the loading area 212, checkout scanning equipment 214, and pick-up area 216, respectively, of the employee checkout station 210.

In some embodiments, the computing system 102 executes the REMT application 132 to monitor and track events in one or more specific "areas of interest" in the retail environment 110, rather than the entire environment 110. Generally, the areas of interest are areas in which important or relevant customer activity is likely to occur (e.g., hiding inventory items in jackets or personal bags, bypassing the scan at the checkout, exiting the store, etc.). The areas of interest may be restricted to locations covered by a legacy camera (e.g., CCTV) system that is already in place, for example. In the store 200, for instance, one or more cameras may be arranged/directed so as to cover an area of interest for each of one, some, or all of the display areas 204. One such area is depicted in FIG. 2 as area of interest 230. Each area of interest 230 may be monitored using a ceiling-mounted or rafter-mounted camera located directly above a display area 204 on the opposite side of the aisle, for example.

Another example area of interest 232 covers the checkout scanning equipment 214 at each of the employee checkout stations 210. This coverage may be useful for preventing employee-assisted theft (e.g., the employee placing an item in a customer's bag without first scanning the item), for example, or merely to track and better understand operation/usage of the employee checkout stations 210, etc. Another, similar area of interest 234 covers the checkout scanning equipment 224 at each of the self-checkout stations 220. This coverage is useful for preventing customer attempts to bypass the scan of (and thus payment for) inventory items, or merely to track and better understand operation/usage of the self-checkout stations 220, etc. Each area of interest 232 or 234 may be monitored using a wall-mounted, ceiling-mounted, or rafter-mounted camera, for example.

Yet another example area of interest 236 covers a portion of the store 200 that customers must (or very likely would) pass through in order to exit (and possibly enter) the store 200. This coverage is useful, for example, to confirm when a suspicious action by a customer (e.g., placing an inventory item in his/her pocket) is an actual shoplifting attempt (e.g., as discussed further below in connection with the alert unit 138), or merely to track and better understand patterns of traffic flow into and/or out of the store 200, etc. The area of interest 236 may be monitored using a wall-mounted, ceiling-mounted, or rafter-mounted camera, for example.

III. Example Process for Checkout Monitoring and Tracking

Figure 3:
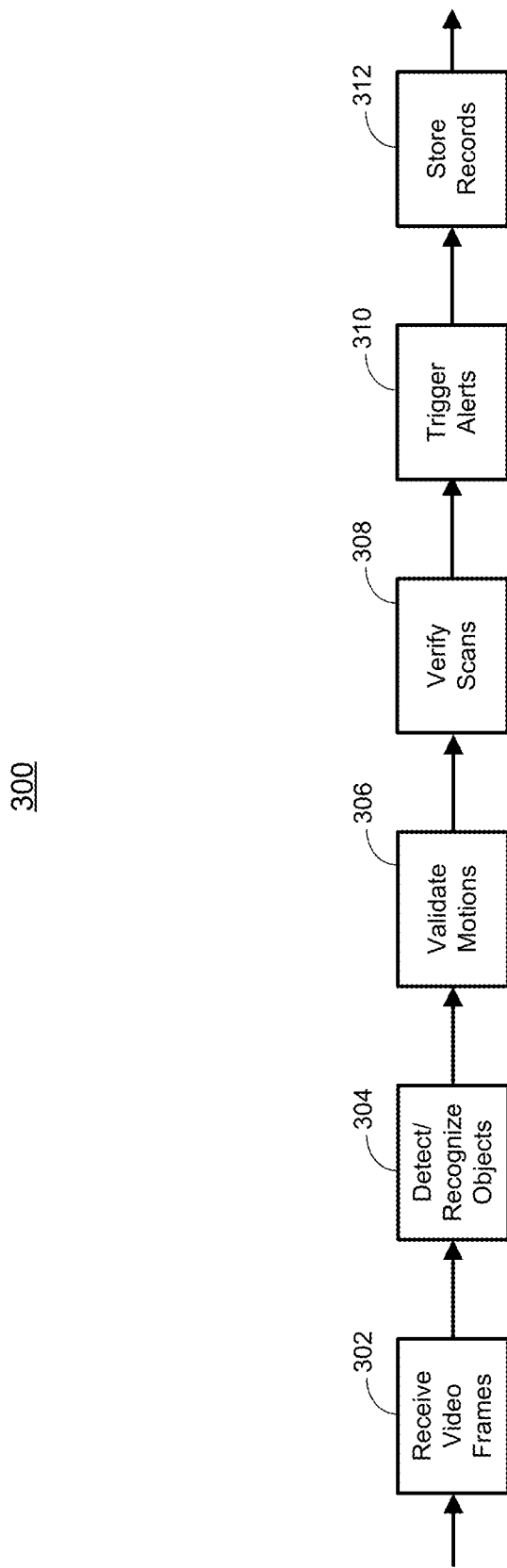
FIG. 3 depicts an example process that the computing system of FIG. 1 may perform when monitoring an area of interest that includes checkout scanning equipment.

FIG. 3 depicts an example process 300 that a computing system (e.g., computing system 102 when executing the REMT application 132) may perform when monitoring an area of interest that includes checkout scanning equipment. For ease of explanation, the process 300 will be described with reference to components of the system 100 of FIG. 1 and the store 200 of FIG. 2, although the process 300 may instead be implemented by other systems and/or in other retail environments. It is understood that the stages 302 through 312 of FIG. 3 may occur iteratively and to some extent concurrently, e.g., with earlier stages operating on later-received video frames while later stages operate on (1) earlier-received video frames and/or (2) outputs that earlier stages produced when operating on earlier-received video frames.

At stage 302 of the example process 300, the computing system 102 receives video frames from at least one camera that captures video of the area of interest (e.g., area of interest 232 or 234). In some embodiments, the process 300 includes an additional stage, after stage 302 and before stage 304, in which the image processing unit 136 performs image pre-processing of some sort. For example, the image processing unit 136 may crop each video frame down to an area of interest within that frame. In one such embodiment, a user defines an area of interest within the camera field of view (e.g., via the display 124, user input device 126, and a graphical user interface provided by the user interface unit 134), and the process 300 includes a stage at which the image processing unit 136 crops each video frame down to the area of interest identified by the user. As a more specific example, an overhead camera at one of the employee checkout stations 210 may capture the entire top surface of the checkout scanning equipment 214 as well as another area (e.g., the loading area 212, the pick-up area 216, a lane where the customer or employee stands, etc.), and the user may define the area of interest so as to include the entire top surface of the checkout scanning equipment 214 while excluding most or all of the area 212, the area 216, and/or other depicted areas. As used herein, the term "cropping" may refer to either generating a new, smaller image or removing information from a part of an image while maintaining the same pixel size (e.g., masking pixels of "removed" areas), or may simply mean that the subsequent image processing step(s) only operate upon the "non-cropped" portion of each image.

Figure 4A:
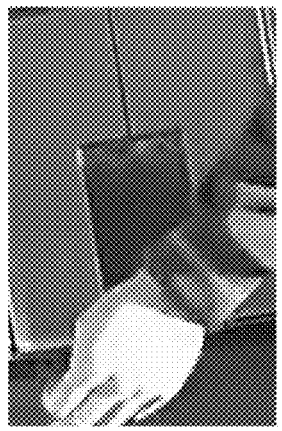
FIGS. 4A-4C depict example images that may be used to train a convolutional neural network for use in the process of FIG. 3.

At stage 304, possibly after cropping and/or other pre-processing as discussed above, the image processing unit 136 uses one of the trained CNN(s) 140 (referred to here as simply CNN 140) to attempt to detect/recognize objects of certain classes within each video frame. Because the CNN 140 is trained in part using numerous images of the "empty" area of interest (e.g., just the top surface of the checkout scanning equipment 214 or 224, without any items, hands, etc.), the CNN 140 can inherently remove "background" components of each video frame. That is, the CNN 140 effectively strips away background components of the video frame except for at least a portion of the checkout scanning equipment (and possibly other areas around that equipment). So long as the CNN 140 is trained using a sufficiently large and diverse set of training images, the CNN 140 can effectively remove the background components (and only the background components) even as other objects pass over and block portions of the background components, and even if the appearance of the background components changes somewhat from one frame to the next (e.g., as lighting/shadows change). A small subset of example "background" images that may be used to train the CNN 140 is shown in FIG. 4A.

Figure 4B:

In some embodiments, one object class that can be recognized by the CNN 140 generally corresponds to inventory items (e.g., products for sale), without attempting to more specifically identify/classify any such items (e.g., without including specific object classes corresponding to specific products or specific categories of products offered within the store 200). A small subset of example "inventory item" images that may be used to train the CNN 140 is shown in FIG. 4B. Using a single, broad category to generally classify inventory items may be particularly beneficial if the camera (e.g., CCTV system) can only provide low-resolution images in the video feed, because the low resolution—and the many different ways and orientations in which someone may handle a given item—can make more specific classification/identification unreliable. In other embodiments, however, the CNN 140 may be trained to distinguish multiple sub-classes of inventory items.

Figure 4C:
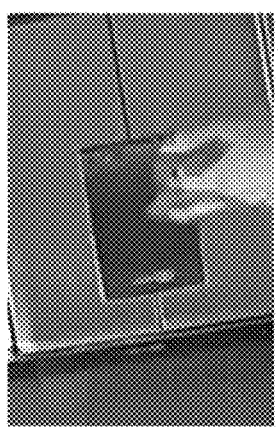

By necessity, hands (of the employee or customer) often appear in the scanning area, which can cause recognition problems (e.g., with the CNN 140 thinking that a human hand is simply another inventory item). To mitigate this problem, in some embodiments, the CNN 140 is also specifically trained to identify hands that appear in the area of interest. A small subset of example "hand" images that may be used to train the CNN 140 is shown in FIG. 4C (where it is understood that a "hand" image may depict just a portion of a hand, or also depict the person's wrist or forearm, etc.). In some embodiments, the CNN 140 is also trained to specifically recognize objects in one or more other classes that might also be expected to appear in the area of interest from time to time (e.g., "personal items" that are any objects other than hands or inventory items, or more specific classes of personal items such as "purse," "smartphone," etc.). However, it can be advantageous to limit the number or specificity of classes when the camera provides only low-resolution images. In some embodiments, for example, the CNN 140 can only identify objects in two classes (e.g., "items" and "hands"), and determines that the area of interest is empty when no object in either of those two classes is detected.

At stage 306 of the example process 300, the REMT application 132 determines whether motions of objects detected at stage 304 are valid. In some embodiments, stage 306 only occurs if and when an inventory item is detected at stage 304 (and not when, for example, a hand is detected or nothing is detected). Stage 306 may include the image processing unit 136 analyzing changes in the intensity of image pixels across successive video frames (and/or outputs of the CNN 140 that indicate object locations across successive video frames), in order to determine whether the inventory item travels according to a particular pattern of motion across those video frames. For scanner equipment with a scanning window on a flat-top surface, for example, the algorithm may determine whether an inventory item moves in a direction from the loading area (e.g., area 212 or 222) towards the pick-up area (e.g., area 216 or 226) and, if so, flag or label the movement as a "valid" scan movement. As another example, in an embodiment where the scanner is a handheld scanning device operated by an employee, the algorithm may determine whether an inventory item moves towards an area just in front of the employee (as he/she scans the item) and then away from the employee (as he/she places the item in a pick-up area).

At stage 308, the REMT application 132 verifies that scans did in fact occur for each detected inventory item (or, in some embodiments, only for each detected inventory item for which a valid scanning motion was also detected). Stage 308 may include the REMT application 132 receiving real-time (and/or time-stamped) scan data from the checkout scanning equipment or an associated computing device and/or software program, for example.

At stage 310, the alert unit 138 determines when alerts (if any) should be sent, and causes any such alerts to be presented or delivered to appropriate personnel (e.g., to a user via the display 124, or by triggering a rich communication service (RCS), short messaging service (SMS), phone call, or other notification to the smartphone or other personal device of a store manager or security personnel, etc.). Stage 310 may include the alert unit 138 applying an algorithm to outputs of stages 304, 306, and 308, for example. In one embodiment, for instance, the alert unit 138 generates a shoplifting alert if an inventory item is detected at stage 304, but no corresponding scan is identified at stage 308. The alert may be a visual alert (e.g., an alert message generated by the alert unit 138 and presented to a user via the display 124, or a flashing light at the checkout station, etc.), and/or an audio alert (e.g., a tone that notifies a store owner or employee that an alert message has been received, or a loud beeping at the checkout station, etc.).

At stage 312, the REMT application 132 causes data of interest (e.g., some or all of the outputs generated at stages 304, 306, 308, and/or 310) to be stored as a digital record in the event database 144. Such data may enable a user (e.g., when applying higher-level analytical software) to better understand how often various events occur at employee and/or self-checkout stations, for example. Moreover, the data may facilitate further refinements and improvements to the REMT application 132 itself (e.g., by identifying common, alternative motion patterns that should also be recognized as valid at stage 306, or by identifying scenarios that should or should not cause the alert unit 138 to generate an alert message, etc.).

Figure 5:
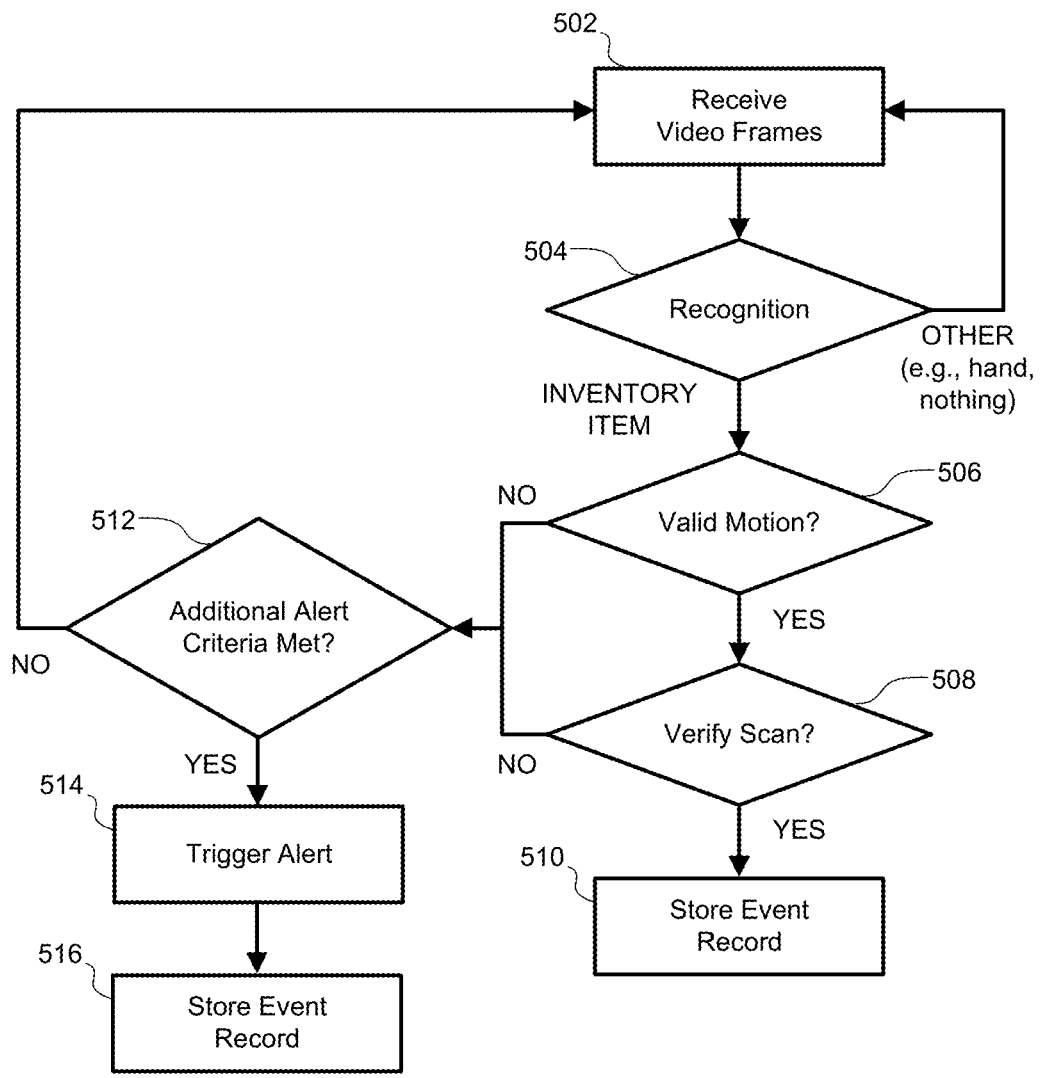
FIG. 5 is a flow diagram of an example algorithm that may be executed in the process of FIG. 3 to trigger alerts and/or create a digital record.

FIG. 5 is a flow diagram of an example algorithm 500 that the REMT application 132 may execute during the process 300 of FIG. 3 in order to trigger alerts and/or create a digital record. At block 502, the REMT application 132 receives video frames (e.g., an arbitrary but consecutive segment of the full set of frames received at stage 302), and at block 504, the image processing unit 136 (using a CNN 140) performs object recognition on the frames. If the image processing unit 136 detects an inventory item at block 504, flow proceeds to block 506. Otherwise, flow returns to block 502 for another iteration corresponding to the next video frame or frames. It is understood that these iterations need not be purely sequential, e.g., the REMT application 132 may receive a next set of video frames (in a subsequent iteration of block 502) while performing object recognition and/or motion validation for the previous set of video frames (in the present iteration of block 504 and/or 506).

At block 506, the image processing unit 136 determines whether an inventory item detected in multiple frames has a motion pattern (e.g., direction of movement) that corresponds to a valid scanning motion, as discussed above in connection with stage 306. If a valid scanning motion is detected, flow proceeds to block 508. At block 508, the REMT application 132 verifies that a corresponding scan occurred (e.g., by communicating with the checkout scanning equipment or associated software, as discussed above in connection with stage 308). If a corresponding scan did occur (i.e., at the same time, or if the scan was registered within some threshold time of detecting the item, etc.), the REMT application 132 stores (or otherwise causes to be stored) an event record (at block 510) indicating the scan of the item and possibly other, associated information (e.g., the time span or frames for which an object was detected, etc.).

If the image processing unit 136 does not detect a valid motion at block 506, or if the REMT application 132 does not determine that a corresponding scan occurred at block 508, flow proceeds to block 512. In the embodiments shown, the alert unit 138 checks at block 512 whether one or more additional alert criteria are satisfied. For example, the image processing unit 136 may also detect whether a motion that is not a valid scanning motion is "suspicious" (e.g., moving the item around the scanning window) or "not suspicious" (e.g., briefly impinging on the side of the area of interest that is nearest to the loading area before moving out of sight back in the direction of the loading area), and the alert unit 138 may only trigger alerts when detecting a "suspicious" motion pattern. If the additional criteria are met, flow proceeds to block 514; otherwise, flow proceeds back to block 502. In other embodiments, block 512 is omitted and there are no additional alert criteria (i.e., the "NO" paths from block 506 and 508 flow directly to block 514).

At block 514, the alert unit 138 triggers an alert, which may be visual and/or audio as discussed above in connection with stage 310. At block 516, the REMT application 132 stores (or otherwise causes to be stored) an event record indicating the alert and possibly the reason for the alert (e.g., data indicating that no corresponding scan was detected at block 508, etc.).

In some embodiments and scenarios, block 504 may include detecting multiple inventory items in the same video segment/frames, with the process 500 following different paths (e.g., with concurrent processing) for each detected item. For example, the REMT application 132 may determine that one detected object had a valid scanning motion and a corresponding scan, but determine that another detected object in the same set of video frames did not have a valid scanning motion and/or corresponding scan (and therefore trigger an alert for the latter item but not for the former item).

It is understood that the process 500 may differ in other embodiments, and include different, fewer, or additional blocks or pathways.

IV. Example Process for Display Area Monitoring and Tracking

Figure 6:
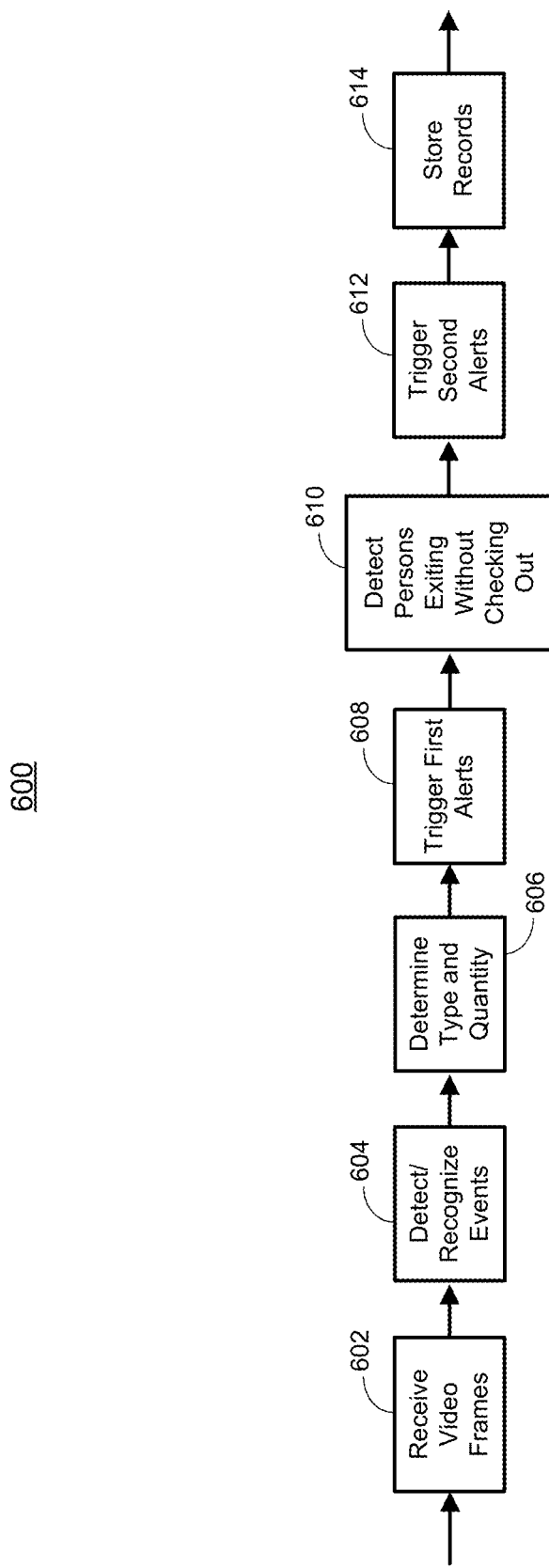
FIG. 6 depicts an example process that the computing system of FIG. 1 may perform when monitoring an area of interest that includes a display area for inventory items.

FIG. 6 depicts an example process 600 that a computing system (e.g., computing system 102 when executing the REMT application 132) may perform when monitoring an area of interest that includes a display area for inventory items (e.g., the area of interest 230 including the display area 204). For ease of explanation, the process 600 will be described with reference to components of the system 100 of FIG. 1 and the store 200 of FIG. 2, although the process 600 may instead be implemented by other systems and/or in other retail environments. It is understood that the stages 602 through 614 of FIG. 6 may occur iteratively and to some extent concurrently, e.g., with earlier stages operating on later-received video frames while later stages operate on (1) earlier-received video frames and/or (2) outputs that earlier stages produced when operating on earlier-received video frames.

At stage 602 of the example process 600, the computing system 102 receives a time series of video frames from at least one camera that captures video of the area of interest. In some embodiments, the process 600 includes an additional stage, after stage 602 and before stage 604, in which the image processing unit 136 performs image pre-processing of some sort (e.g., cropping and/or other pre-processing as discussed above in connection with FIG. 3).

Figure 7A:
FIGS. 7A-7C depict example images that may be used to train a convolutional neural network for use in the process of FIG. 6.
Figure 7C:
Figure 7B:

At stage 604, possibly after cropping and/or other pre-processing, the image processing unit 136 uses one of the trained CNN(s) 140 (referred to here as simply CNN 140) to attempt to detect/recognize events of certain classes within each video frame, or within sets of video frames. In some embodiments, one event class that can be recognized by the CNN 140 corresponds to an instance of a person picking up at least one inventory item from the display area. Other event classes that may be recognized by the CNN 140 may correspond to instances of a person putting at least one inventory item in an approved conveyance (e.g., in a store-owned trolley or basket), instances of a person putting at least one inventory item in an unapproved conveyance (e.g., a purse or other personal bag), instances of a person putting at least one inventory item in an item of clothing (e.g., coat) that he or she is wearing, instances of a person standing near the display area, instances of a person walking through the display area, and so on. Example images that may be used to train the CNN 140 for classes such as "person standing," "person putting item in clothing," and "person putting item in unapproved conveyance" are shown in FIGS. 7A, 7B, and 7C, respectively. In some embodiments, the CNN 140 is further trained to identify employees, e.g., based on uniforms that are specific to employees of that store.

At stage 606, for each detected event corresponding to a person removing an inventory item from the display area (or for each such event where the person is also determined to not be an employee), the REMT application 132 determines the type of item removed and the quantity removed. Attempting to directly identify and count each removed item based on the video feed may be unreliable if the camera (e.g., CCTV system) only provides low-resolution images/frames, and also due to the many different ways in which customers can interact with (e.g., pick up and/or hold) inventory items. Thus, in the depicted embodiment of FIG.

6, the CNN 140 itself does not attempt to specifically identify the type of item, or attempt to identify how many items are picked up.

Figure 8:
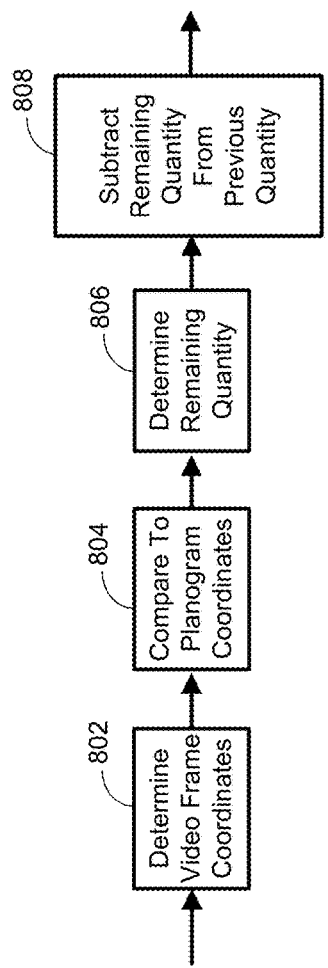
FIG. 8 depicts an example process that the computing system of FIG. 1 may perform when determining the quantity of removed items in the process of FIG. 6.

Instead, at stage 606, the REMT application 132 may perform a process such as the process 800 shown in FIG. 8. At stage 802 of the process 800, the image processing unit 136 determines coordinates within the video frame(s) corresponding to the area, within the area of interest, from which the item(s) was/were picked up. For example, the CNN 140 may output data indicative of coordinates, within the frame/image, at which the detected event (e.g., "person picks up item") occurred or first occurred. Thereafter, at stage 804, the REMT application 132 compares the frame/image coordinates to planogram coordinates (possibly after first mapping the frame/image coordinates to another set of coordinates that correspond to the planogram coordinates) to determine which type of product was taken. The planogram may be a table or database (e.g., stored in the memory 130) that maps coordinates to different types of products based on the known placement (i.e., the proper/expected placement) of those product types within the display area, for example.

At stage 806, the image processing unit 136 processes the image/frame (or at least, the portion of the image/frame corresponding to the area from which the item(s) was/were picked up) to determine the quantity of the item/product remaining after the interaction. To this end, the CNN 140 (or another of the CNN(s) 144 or another model) may process the image to detect/recognize each instance of and count the item in the corresponding space of the display area. At stage 808, the REMT application 808 then determines the quantity taken (z) by subtracting the remaining/counted quantity (y) from the previous quantity (x) (i.e., $z=x-y$). Similar to other techniques described herein, this technique can be particularly beneficial where only low-resolution images are available, given how complex and varied customer/item interactions can be (e.g., depending on how the customer is oriented with respect to the camera and display area, whether other customers are nearby, how the size and shape of a particular item causes different people to grab ahold of it in different ways, etc.).

Referring again now to FIG. 6, at stage 608, the alert unit 138 triggers "first" alerts for each case in which one or more "suspect" event classes were detected at stage 604, and causes any such alerts to be presented or delivered to appropriate personnel (e.g., to a user via the display 124, or triggering an RCS, SMS, phone call, or other notification to the smartphone or other personal device of a store manager or security personnel, etc.). Stage 608 may include the alert unit 138 applying an algorithm to outputs of stages 604 and/or 606, for example. The alert may be a visual alert (e.g., an alert message generated by the alert unit 138 and presented to a user via the display 124, or a flashing light over an aisle, etc.), and/or an audio alert (e.g., a tone that notifies a store owner or employee that an alert message has been received, or a loud beeping near an aisle, etc.).

"Suspect" classes may include one or more classes that correspond to highly suspicious activities, such as a person (or specifically a non-employee) placing an item in his/her clothing, a person (or specifically a non-employee) placing an item in his or her personal conveyance (e.g., a purse or other bag), and so on. In other embodiments, however, the classes that trigger first alerts need not all represent highly suspicious activities, and may instead include classes that simply make a higher level of awareness prudent. In some embodiments, for example, the alert unit 138 triggers a first alert any time that the image processing unit 136 determines that a person picked up an item from the display area.

Moreover, in some embodiments, the alert unit 608 only triggers a first alert if the REMT application 132 also determines that one or more other criteria are met (e.g., if the CNN 140 does not detect a subsequent "person placing item in display area" event that the REMT application 132 can attribute to the same person and/or item(s), and/or if the CNN 140 does not identify an employee uniform or badge for the same person, etc.).

At stage 610, the image processing unit 136 detects when a person for whom a first alert was triggered (at stage 608) exits the retail environment (e.g., store 200) without first checking out and/or paying for the item(s). Stage 610 may include the image processing unit 136 receiving camera video frames from one or more other cameras configured to monitor an area that customers must (or most likely would) pass through in order to exit the store (e.g., area of interest 236). Stage 610 may also include the image processing unit 136 implementing a person recognition (e.g., facial recognition) technique to match the person associated with a given first alert with a person exiting the retail environment, while maintaining anonymity (e.g., without any attempt to matching faces or other characteristics to names or other personal data). In some cases (e.g., due to exceedingly poor image resolution), person recognition may be based on attributes other than facial features (e.g., color of clothing, body size, etc.). To confirm that a person did not check out (e.g., at one of stations 210 or 220) before exiting, stage 610 may include the image processing unit 136 applying similar person recognition techniques based on video feeds from all checkout stations, and/or based on whether any checkout scanning equipment data showed a scan of type and count of the item(s) as determined at stage 606.

At stage 612, the alert unit 138 triggers "second" alerts for each case in which a "first" alert was already triggered, and in which the REMT application 132 further determines at stage 610 that the same person is exiting without checking out (or without the specific item(s) taken by the person having been scanned). Stage 612 includes causing any such alerts to be presented or delivered to appropriate personnel (e.g., to a user via the display 124, or triggering a notification to the smartphone or other personal device of a store manager or security personnel, etc.).

In some embodiments, rather than triggering a first alert, the alert unit 138 merely enters an "active" state at stage 608, and only triggers an alert at stage 612 if both (1) the alert unit 138 is in the active state and (2) the REMT application 132 determines at block 610 that the person is exiting without checking out and/or without the item(s) having been scanned.

At stage 614, the REMT application 132 causes all data of interest (e.g., some or all of the outputs generated at stages 604, 606, 608, 610, and/or 612) to be stored as a digital record in the event database 144. Such data may enable a user (e.g., when applying higher-level analytical software) to better understand how often various events occur at display areas, for example. Moreover, the data may facilitate further refinements and improvements to the REMT application 132 itself (e.g., by assessing whether quantities are accurately being counted at stage 606, or by identifying scenarios that should or should not cause the alert unit 138 to trigger first or second alerts, etc.).

Figure 9:
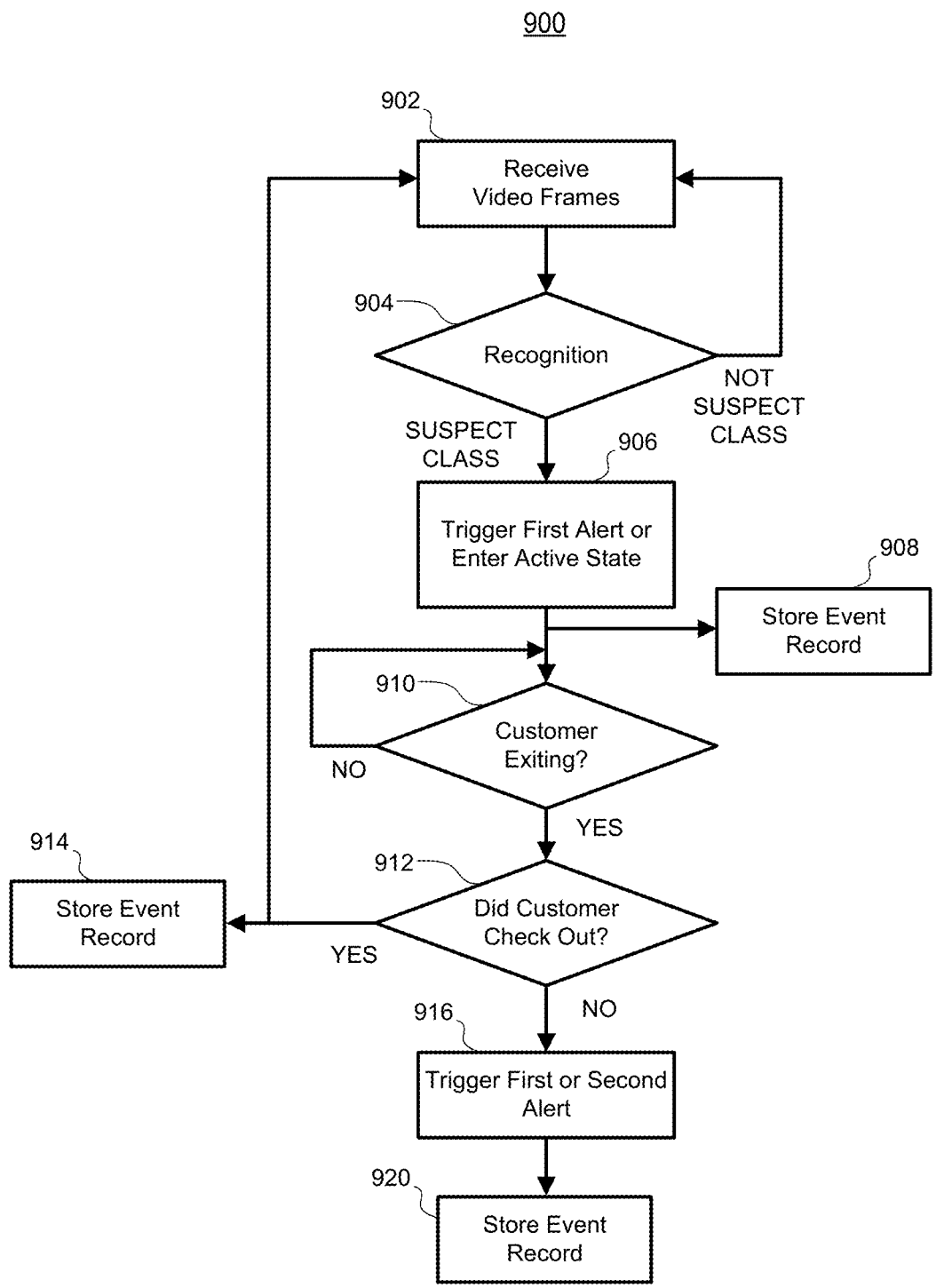
FIG. 9 is a flow diagram of an example algorithm that may be executed in the process of FIG. 6 to trigger alerts and/or create a digital record.

FIG. 9 is a flow diagram of an example algorithm 900 that the REMT application 132 may execute during the process 600 of FIG. 6 in order to trigger alerts and/or create a digital record. At block 902, the REMT application 132 receives video frames (e.g., an arbitrary but consecutive segment of the full set of frames received at stage 602), and at block 904, the image processing unit 136 (using a CNN 140) performs object recognition to detect events depicted by the frames. If the image processing unit 136 detects an event in a suspect class at block 904, flow proceeds to block 906. Otherwise, flow returns to block 902 for another iteration corresponding to the next video frame or frames. It is understood that these iterations need not be purely sequential, e.g., the REMT application 132 may receive a next set of video frames (in a subsequent iteration of block 902) while performing object recognition and/or evaluating alert criteria for the previous set of video frames (in the present iteration of block 904, 906, 910, etc.).

As noted above, "suspect" classes may include one or more classes that correspond to highly suspicious activities, such as a person placing an item in his/her clothing or a person placing an item in his or her personal conveyance, and/or may include one or more classes that are not necessarily suspicious but warrant heightened attention (e.g., a class corresponding to a person simply picking up an item from the display area). Moreover, in some embodiments, flow proceeds to block 906 only if the REMT application 132 first determines that one or more other criteria are met (e.g., if the CNN 140 does not detect a "person placing item in display area" event that the REMT application 132 can attribute to the same person and/or item(s), and/or if the CNN 140 does not identify an employee uniform or badge for the same person, etc.).

At block 906, the image processing unit 136 triggers a first alert (e.g., a warning message indicating that a potential shoplifting event may be underway), or causes the alert unit 138 to enter an "active" state (e.g., without triggering an alert), and at block 908 the REMT application 132 causes a corresponding event to be stored in the event database 144. At block 910, the REMT application 132 determines whether the customer associated with the first alert (or active state) is exiting the retail environment (e.g., whether the same person is passing through an area such as area 236, or is passing through that area specifically in the "exit" direction). Block 906 may be similar to block 608.

If the REMT application 132 does not determine that the customer is exiting, the REMT application 132 may continuously monitor for such an exit (e.g., until/unless the REMT application 132 detects that the customer checks out or pays, at which point the process 900 may terminate or proceed to a block similar to block 908). If the REMT application 132 determines that the customer is exiting, flow proceeds to block 912. At block 912, the REMT application 132 may communicate with checkout scanning equipment or an associated computing device or software to check whether the item(s) picked up by (and possibly concealed by) the customer was/were scanned. If so, flow proceeds to block 914, at which the REMT application 132 causes a corresponding event to be stored in the event database 144, and also proceeds back to block 902 to continue iterations of the process 900.

If the customer did not check out and/or pay, flow proceeds to block 916. At block 916, the alert unit 138 triggers a second alert (e.g., a different visual and/or audio alert), or (if the alert unit 138 merely switched to an active state for the customer at block 906) a first alert). Block 916 may be similar to block 608. At block 920, the REMT application 132 stores (or otherwise causes to be stored) an event record indicating the alert of block 916 and possibly the reason for the alert (e.g., data indicating that the customer first put an item in his/her coat and then exited without passing through any checkout area and/or without the item being scanned).

It is understood that the process 900 may differ in other embodiments, and include different, fewer, or additional blocks or pathways. For example, the REMT application 132 may continuously monitor whether a customer picking up an item puts that item back on the shelf, and terminate the process 900 (possibly after storing data indicative of that event in the event database 144) whenever such a "return" event happens.

V. Example Methods

Figure 10:
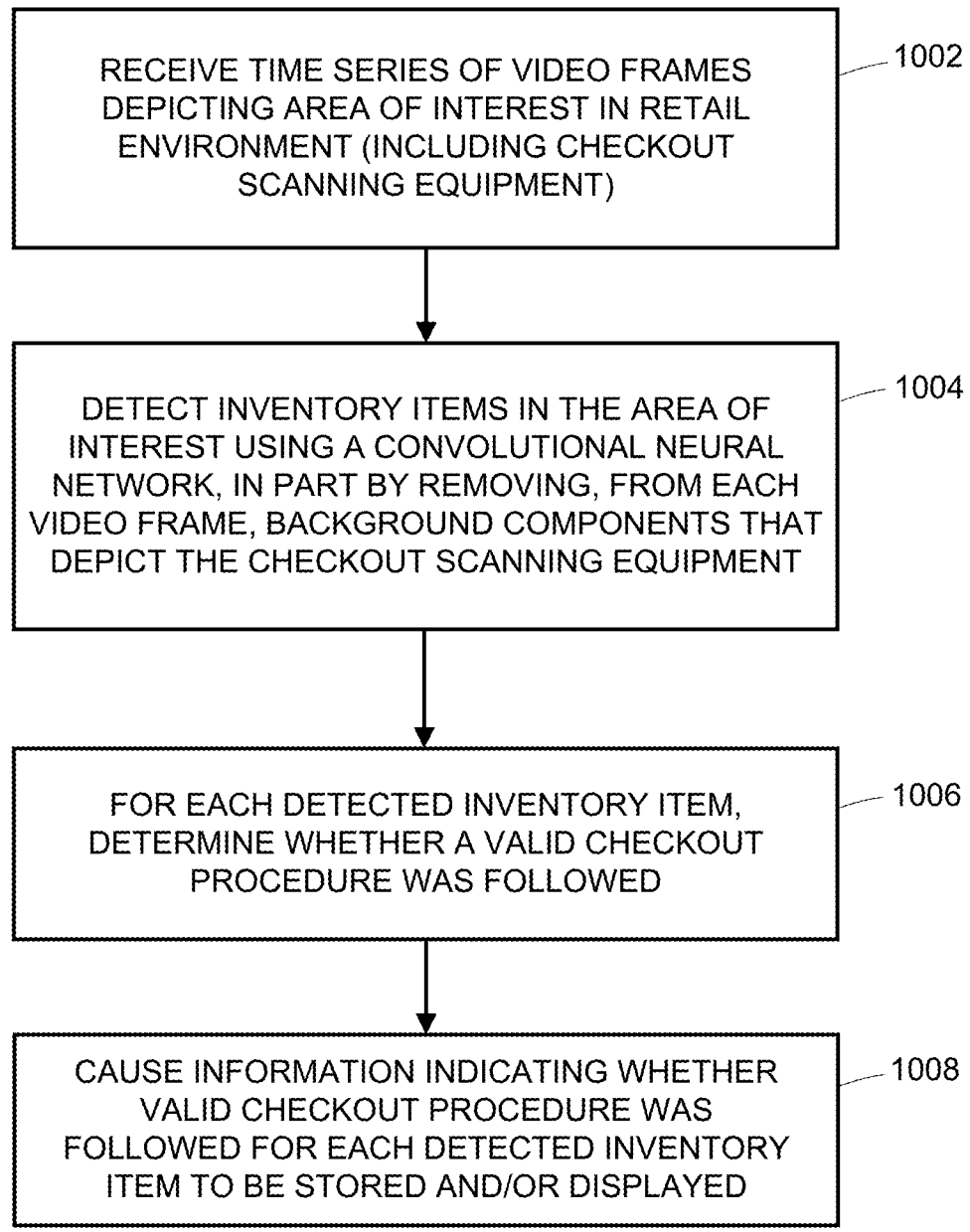
FIG. 10 is a flow diagram of an example method of monitoring checkout activity in a retail environment.

FIG. 10 is a flow diagram of an example method 1000 of monitoring checkout activity in a retail environment. The method 1000 may be implemented, in whole or in part, by one or more components of the system 100 of FIG. 1, such as the computing system 102 (e.g., by the processing hardware 120, when executing instructions of the REMT application 132 stored in the memory 130), for example.

At block 1002 of the method 1000, a time series of video frames is received. The video frames depict an area of interest in the retail environment that includes checkout scanning equipment (i.e., at least a portion of the equipment, such as a surface that includes a scanning window as shown in FIG. 4A).

At block 1004, inventory items are detected in the area of interest by using a CNN (e.g., the CNN model 140 discussed above with respect to FIGS. 3-5) to process the time series of video frames. Block 1004 includes removing, from each video frame, background components that depict the checkout scanning equipment (e.g., all or most components of the frame/image that depict the portion of the equipment that is within the area of interest). In some embodiments and/or scenarios (e.g., where there is a larger area of interest), the area of interest also includes one or more areas around the checkout scanning equipment, such as a lane into which customers bring shopping trolleys or baskets. In such embodiments, the background components removed at block 1004 may include those trolleys or baskets (but not necessarily the items within the trolleys or baskets).

In some embodiments, block 1004 includes classifying different portions of the time series of video frames (e.g., specific video frames, specific portions of specific frames, or specific sequences of two or more video frames) as one of a plurality of candidate classifications. The set of candidate classifications generally depends on the area of interest that has been defined. For an area of interest that exclusively, or almost exclusively, shows the top of checkout scanning equipment, for example, a first classification may generally correspond to an inventory item (rather than a specific inventory item), a second classification may generally correspond to an object (other than an inventory item) that might be expected to appear over the scanning area (e.g., hands of a person, or possibly personal items such as smartphones, etc.), and a third classification may correspond to no object being in the area of interest.

At block 1006, for each inventory item detected at block 1004, it is determined whether a valid checkout procedure (e.g., a valid checkout scanning procedure) was followed. Block 1006 may include determining whether the detected inventory item corresponds to a scan made by the checkout scanning equipment (e.g., by communicating with the equipment or an associated computing device and/or software), for example.

At block 1008, information indicating whether the valid checkout procedure was followed for each detected inventory item in the area of interest is caused to be stored (e.g., in the event database 144) and/or displayed (e.g., via the display 124). Block 1008 may include generating a command/instruction message and transmitting the message to one or more subsystems that are configured to directly store and/or display information, for example, or may include directly storing and/or displaying the information. In some embodiments and scenarios where block 1006 includes determining that a detected inventory item does not correspond to any scan made by the checkout scanning equipment, block 1008 includes, for each such instance, causing an alert message to be displayed (e.g., by generating a command/instruction message and transmitting the message to a subsystem that is configured to generate and/or send alerts to one or more user devices, or by directly generating and/or sending the alert to one or more user devices).

Blocks 1002, 1004, 1006, and 1008 may occur repeatedly, e.g., substantially in real-time as subsequent video frames or sets of video frames are received at block 1002. For example, blocks 1002 and 1004 may be repeated for each video frame, and blocks 1006 and/or 1008 may be repeated for each set of N video frames (e.g., with N=10, 100, etc., or with N varying depending on factors such as how many successive frames depict a particular inventory item).

In some embodiments, the method 1000 includes one or more additional blocks not shown in FIG. 10. For example, the method 1000 may include an additional block in which a pattern of motion (e.g., a direction of movement) is determined for each detected inventory item in the area of interest, in which case block 1006 may include determining whether the pattern of motion is in accordance with the valid checkout procedure (e.g., valid scanning procedure). As another example, the method 1000 may include a first additional block in which it is determined whether the background components of the area of interest have changed, and a second additional block in which an alert message is caused to be displayed when determining that the background components have changed. Determining whether background components have changed may be based on how well the CNN performs its classification task, for example. In one example of such an embodiment, the method 1000 includes determining that the background components have changed if confidence scores of the CNN fall below some threshold level (e.g., for some threshold number of successive video frames).

Figure 11:
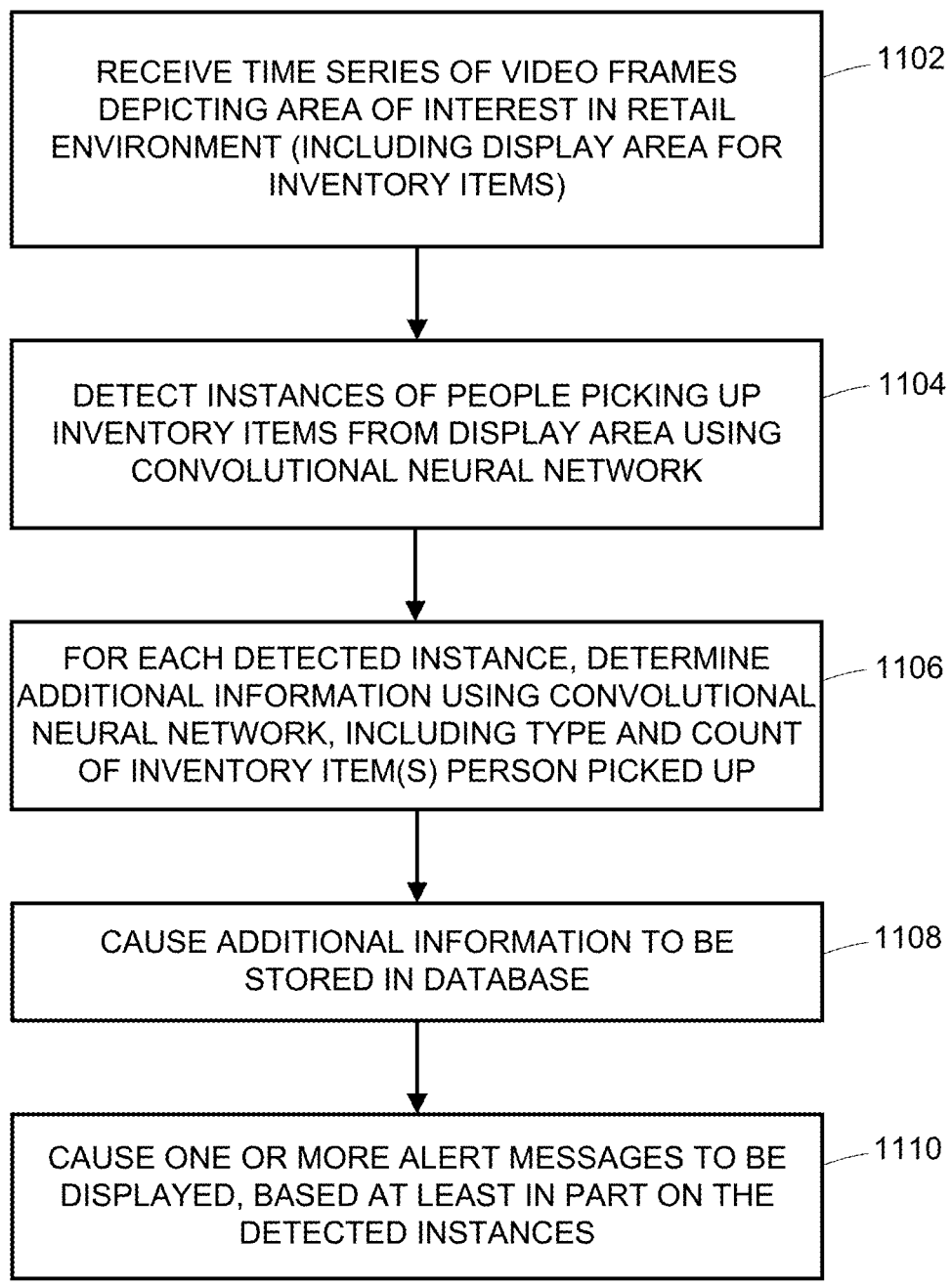
FIG. 11 is a flow diagram of an example method of monitoring a display area in a retail environment.

FIG. 11 is a flow diagram of an example method 1100 of monitoring a display area for inventory items in a retail environment. The method 1100 may be implemented, in whole or in part, by one or more components of the system 100 of FIG. 1, such as the computing system 102 (e.g., by the processing hardware 120, when executing instructions of the REMT application 132 stored in the memory 130), for example.

At block 1102 of the method 1100, a time series of video frames is received. The video frames depict an area of interest in the retail environment that includes the display area (e.g., similar to the boxed area shown in FIG. 7A).

At block 1104, instances of people picking up inventory items from the display area are detected using a CNN (e.g., the CNN model 140 discussed above with respect to FIGS. 6-9). In some embodiments, block 1104 includes classifying different portions of the time series of video frames (e.g., specific video frames, specific portions of specific frames, or specific sequences of two or more video frames) as one of a plurality of candidate classifications. The set of candidate classifications generally depends on the area of interest that has been defined. For an area of interest that exclusively, or almost exclusively, shows shelves of the display area (e.g., along a store aisle), for example, a first classification may correspond to a person picking up at least one inventory item from the display area, with each instance detected at block 1104 being an instance in which the CNN outputs the first classification. In some embodiments, a second classification corresponds to a person putting at least one inventory item in an approved conveyance (e.g., store trolley or basket), a third classification corresponds to a person putting at least one inventory item in an unapproved conveyance (e.g., a purse), and/or a fourth classification corresponding to a person putting at least one inventory item in an item of clothing (e.g., coat) worn by the person.

In some embodiments, a first subset consisting of one or more of the candidate classifications does not correspond to "suspect" activity, while a second subset consisting of one or more other of the candidate classifications does correspond to suspect activity. For example, the first subset may include the second classification noted above, while the second subset may include the third and fourth classifications noted above. The first classification noted above (picking up an item) may be in the first (not suspect) or second (suspect) subset of classifications, depending on the embodiment. As further examples, the first (not suspect) subset of classifications may include a classification corresponding to a person walking by the display area without picking up any inventory item, a classification corresponding to a person standing by the display area without picking up any inventory item, a classification corresponding to a person placing one or more inventory items in the display area (e.g., returning one or more items to the display area), a classification corresponding to a person being a store employee, and so on.

At block 1106, for each instance detected at block 1104, additional information is determined using the CNN, including a type and a count/quantity of inventory items that a person picked up in that particular instance. Determining the type of inventory item may include using the CNN to determine coordinates of a specific portion of a video frame corresponding to an area where the person picked up the one or more inventory items, and then determining the type of inventory item using the coordinates of that specific portion of the video frame and a planogram that indicates locations in the display area at which specific inventory items are stocked. Determining the count may include determining a count of how many inventory items remain in the area where the person picked up the one or more inventory items (e.g., using a CNN or another image processing technique), and then subtracting that count from a previous count of inventory items in the area where the person picked up the inventory item(s).

At block 1108, the additional information determined at block 1106 is caused to be stored in a database (e.g., event database 144). Block 1108 may include generating a command/instruction message and transmitting the message to a subsystem that is configured to directly store information, for example, or may include directly storing the information.

At block 1110, one or more alert messages are caused to be displayed, based at least in part on the instances detected at block 1106. Block 1110 may include generating a command/instruction message and transmitting the message to a subsystem that is configured to generate the message(s) and/or send the message(s) to one or more user devices, directly generating the message(s) and/or sending the message(s) to the user device(s), or directly displaying the message(s) (e.g., via the display 124). In some embodiments, block 1110 includes causing a first alert message to be displayed at least partially in response to classifying a portion of the time series of video frames as one of the second (suspect) subset of classifications noted above.

Blocks 1102, 1104, 1106, 1108, and 1110 may occur repeatedly, substantially in real-time as subsequent video frames or sets of video frames are received at block 1102. For example, blocks 1102 and 1104 may be repeated for each video frame, and blocks 1106, 1108, and/or 1110 may be repeated for each set of N video frames (e.g., with N=10, 100, etc., or with N varying depending on factors such as how many successive frames depict a particular event occurring).

In some embodiments, the method 1100 includes one or more additional blocks not shown in FIG. 11. For example, the method 1100 may include a first additional block in which it is determined, using the CNN, that an object is obstructing a view of the display area for at least a threshold amount of time (e.g., at least 10 seconds, or at least one minute, etc.), and a second additional block in which, in response to determining that the object is obstructing the view for at least the threshold amount of time, an obstruction alert message is caused to be displayed (e.g., via the display 124).

As another example, the method 1100 may include a first additional block in which an additional time series of video frames depicting an additional area of interest in the retail environment (e.g., a store exit area) is received, and a second additional block in which it is determined, by classifying different portions of the additional time series of video frames, that at least one inventory item picked up at the display area was not, or will not likely be, checked out. For example, the first alert message mentioned above in connection with block 1110 may be displayed not only in response to the "suspect" classification (which may have triggered an "active" state as discussed above), but also in response to the subsequent determination that the inventory item(s) was/were not, or will not likely be, checked out.

As still another example, the method 1100 may include a first additional block in which an additional time series of video frames depicting an additional area of interest in the retail environment (e.g., a store exit area) is received, a second additional block in which it is determined, by classifying different portions of the additional time series of video frames, that at least one inventory item picked up at the display area was not, or will not likely be, checked out, and a third additional block in which a second alert message (subsequent to the first alert message discussed above) is caused to be displayed in response to that determination.

The following list of examples reflects a variety of the embodiments explicitly contemplated by the present disclosure.

Example 1. A method of monitoring checkout activity in a retail environment, the method comprising: receiving, by one or more processors of a computing system, a time series of video frames depicting an area of interest in the retail environment, wherein checkout scanning equipment is located in the area of interest; detecting, by the one or more processors and using a convolutional neural network to process the time series of video frames, inventory items in the area of interest, wherein detecting the inventory items in the area of interest includes removing, from each video frame of the time series, background components that depict the checkout scanning equipment; determining, by the one or more processors and for each detected inventory item in the area of interest, whether a valid checkout procedure was followed; and causing, by the one or more processors, information indicating whether the valid checkout procedure was followed for each detected inventory item in the area of interest to be stored and/or displayed.

Example 2. The method of example 1, further comprising: determining, by the one or more processors and for each detected inventory item in the area of interest, a pattern of motion, wherein determining whether the valid checkout procedure was followed includes determining whether the pattern of motion is in accordance with the valid checkout procedure.

Example 3. The method of example 2, wherein determining whether the pattern of motion is in accordance with the valid checkout procedure includes determining a direction of movement for the detected inventory item.

Example 4. The method of any one of examples 1-3, wherein determining whether the valid checkout procedure was followed includes determining whether the detected inventory item corresponds to a scan made by the checkout scanning equipment.

Example 5. The method of example 4, wherein causing the information to be stored and/or displayed includes: for each instance of determining that the detected inventory item does not correspond to any scan made by the checkout scanning equipment, causing an alert message to be displayed.

Example 6. The method of any one of examples 1-5, wherein detecting inventory items in the area of interest includes classifying different portions of the time series of video frames as one of a plurality of candidate classifications.

Example 7. The method of example 6, wherein the plurality of candidate classifications includes: a first classification corresponding to an inventory item; a second classification corresponding to an object other than an inventory item; and a third classification corresponding to no object.

Example 8. The method of example 7, wherein the second classification corresponds to one or more hands of a person.

Example 9. The method of any one of examples 6-8, wherein classifying the different portions of the time series of video frames includes classifying each video frame of the time series of video frames.

Example 10. The method of any one of examples 1-9, further comprising: determining, by the one or more processors, whether the background components of the area of interest have changed; and for each instance of determining that the background components have changed, causing an alert message to be displayed.

Example 11. The method of any one of examples 1-10, wherein the background components of the area of interest also depict a trolley or basket.

Example 12. A computing system comprising: one or more processors; and memory storing instructions that, when executed by the one or more processors, cause the computing system to receive a time series of video frames depicting an area of interest in a retail environment, wherein checkout scanning equipment is located in the area of interest, detect, using a convolutional neural network to process the time series of video frames, inventory items in the area of interest, wherein detecting the inventory items in the area of interest includes removing, from each video frame of the time series, background components that depict the checkout scanning equipment, determine, for each detected inventory item in the area of interest, whether a valid checkout procedure was followed, and cause information indicating whether the valid checkout procedure was followed for each detected inventory item in the area of interest to be stored and/or displayed.

Example 13. The computing system of example 12, wherein the instructions further cause the computing system to: determine, for each detected inventory item in the area of interest, a pattern of motion, wherein determining whether the valid checkout procedure was followed includes determining whether the pattern of motion is in accordance with the valid checkout procedure.

Example 14. The computing system of example 13, wherein determining whether the pattern of motion is in accordance with the valid checkout procedure includes determining a direction of movement for the detected inventory item.

Example 15. The computing system of any one of examples 12-14, wherein determining whether the valid checkout procedure was followed includes determining whether the detected inventory item corresponds to a scan made by the checkout scanning equipment.

Example 16. The computing system of example 15, wherein causing the information to be stored and/or displayed includes: for each instance of determining that the detected inventory item does not correspond to any scan made by the checkout scanning equipment, causing an alert message to be displayed.

Example 17. The computing system of any one of examples 12-16, wherein detecting inventory items in the area of interest includes classifying different portions of the time series of video frames as one of a plurality of candidate classifications.

Example 18. The computing system of example 17, wherein the plurality of candidate classifications includes: a first classification corresponding to an inventory item; a second classification corresponding to an object other than an inventory item; and a third classification corresponding to no object.

Example 19. The computing system of example 18, wherein the second classification corresponds to one or more hands of a person.

Example 20. The computing system of any one of examples 17-19, wherein classifying the different portions of the time series of video frames includes classifying each video frame of the time series of video frames.

Example 21. The computing system of any one of examples 12-20, wherein the instructions further cause the computing system to: determine whether the background components of the area of interest have changed; and for each instance of determining that the background components have changed, cause an alert message to be displayed.

Example 22. The computing system of any one of examples 12-21, wherein the background components of the area of interest also depict a trolley or basket.

Example 23. A method of monitoring a display area for inventory items in a retail environment, the method comprising: receiving, by one or more processors of a computing system, a time series of video frames depicting an area of interest in the retail environment, wherein the display area is located in the area of interest; detecting, by the one or more processors and using a convolutional neural network to process the time series of video frames, instances of people picking up inventory items from the display area; for each instance of detecting a person picking up one or more inventory items from the display area, determining, by the one or more processors and using the convolutional neural network, additional information including (i) a type of inventory item that the person picked up and (ii) a count of how many inventory items the person picked up; causing the additional information to be stored in a database; and causing, by the one or more processors and based at least in part on the detected instances of people picking up inventory items from the display area, one or more alert messages to be displayed.

Example 24. The method of example 23, wherein determining the type of inventory item that the person picked up includes: determining, using the convolutional neural network, coordinates of a specific portion of a video frame corresponding to an area where the person picked up the one or more inventory items; and determining the type of inventory item using the coordinates of the specific portion of the video frame and a planogram that indicates locations in the display area at which specific inventory items are stocked.

Example 25. The method of example 24, wherein determining the count of how many inventory items the person picked up includes: determining a count of how many inventory items remain in the area where the person picked up the one or more inventory items; and subtracting the count of how many inventory items remain from a previous count of inventory items in the area where the person picked up the one or more inventory items.

Example 26. The method of any one of examples 23-25, wherein: detecting the instances of people picking up inventory items from the display area includes classifying different portions of the time series of video frames as one of a plurality of candidate classifications; the plurality of candidate classifications includes a first classification corresponding to a person picking up at least one inventory item from the display area; and detecting each of the instances of people picking up inventory items from the display area includes classifying a corresponding portion of the time series of video frames as the first classification.

Example 27. The method of example 26, wherein the plurality of candidate classifications further includes: a second classification corresponding to a person putting at least one inventory item in an approved conveyance; and a third classification corresponding to a person putting at least one inventory item in an unapproved conveyance.

Example 28. The method of example 27, wherein the plurality of candidate classifications further includes a fourth classifications corresponding to a person putting at least one inventory item in an item of clothing worn by the person.

Example 29. The method of example 28, wherein: the plurality of candidate classifications includes a first subset of one or more classifications not corresponding to suspicious activity and a second subset of one or more classifications corresponding to suspicious activity, the first subset including the second classification and the second subset including the third and fourth classifications; and causing the one or more alert messages to be displayed includes causing a first alert message to be displayed at least partially in response to classifying a first portion of the time series of video frames as one of the second subset of classifications.

Example 30. The method of example 29, further comprising: receiving, by the one or more processors, an additional time series of video frames depicting an additional area of interest in the retail environment; and determining, by the one or more processors classifying different portions of the additional time series of video frames, that at least one inventory item picked up at the display area was not, or will not likely be, checked out, wherein causing the first alert message to be displayed is also in response to determining that the at least one inventory item picked up at the display area was not, or will not likely be, checked out.

Example 31. The method of example 29, further comprising: receiving, by the one or more processors, an additional time series of video frames depicting an additional area of interest in the retail environment; determining, by the one or more processors classifying different portions of the additional time series of video frames, that at least one inventory item picked up at the display area was not, or will not likely be, checked out; and causing, by the one or more processors, a second alert message to be displayed in response to determining that the at least one inventory item picked up at the display area was not, or will not likely be, checked out.

Example 32. The method of any one of examples 29-31, wherein the first subset of classifications includes one or more of: a classification corresponding to a person walking by the display area without picking up any inventory item; a classification corresponding to a person standing by the display area without picking up any inventory item; or a classification corresponding to a person placing one or more inventory items in the display area.

Example 33. The method of any one of examples 29-32, wherein the first subset of classifications includes a classification corresponding to a person being a store employee.

Example 34. The method of any one of examples 26-33, wherein classifying the different portions of the time series of video frames includes classifying each video frame of the time series of video frames.

Example 35. The method of any one of examples 23-34, further comprising: determining, by the one or more processors and using the convolutional neural network, that an object is obstructing a view of the display area for at least a threshold amount of time; and in response to determining that the object is obstructing the view of the display area for at least the threshold amount of time, causing, by the one or more processors, an obstruction alert message to be displayed.

Example 36. A computing system comprising: one or more processors; and memory storing instructions that, when executed by the one or more processors, cause the computing system to receive a time series of video frames depicting an area of interest in a retail environment, wherein a display area is located in the area of interest, detect, using a convolutional neural network to process the time series of video frames, instances of people picking up inventory items from the display area, for each instance of detecting a person picking up one or more inventory items from the display area, determine, using the convolutional neural network, additional information including (i) a type of inventory item that the person picked up and (ii) a count of how many inventory items the person picked up, cause the additional information to be stored in a database, and cause, based at least in part on the detected instances of people picking up inventory items from the display area, one or more alert messages to be displayed.

Example 37. The computing system of example 36, wherein determining the type of inventory item that the person picked up includes: determining, using the convolutional neural network, coordinates of a specific portion of a video frame corresponding to an area where the person picked up the one or more inventory items; and determining the type of inventory item using the coordinates of the specific portion of the video frame and a planogram that indicates locations in the display area at which specific inventory items are stocked.

Example 38. The computing system of example 37, wherein determining the count of how many inventory items the person picked up includes: determining a count of how many inventory items remain in the area where the person picked up the one or more inventory items; and subtracting the count of how many inventory items remain from a previous count of inventory items in the area where the person picked up the one or more inventory items.

Example 39. The computing system of any one of examples 36-38, wherein: detecting the instances of people picking up inventory items from the display area includes classifying different portions of the time series of video frames as one of a plurality of candidate classifications; the plurality of candidate classifications includes a first classification corresponding to a person picking up at least one inventory item from the display area; and detecting each of the instances of people picking up inventory items from the display area includes classifying a corresponding portion of the time series of video frames as the first classification.

Example 40. The computing system of example 39, wherein the plurality of candidate classifications further includes: a second classification corresponding to a person putting at least one inventory item in an approved conveyance; and a third classification corresponding to a person putting at least one inventory item in an unapproved conveyance.

Example 41. The computing system of example 40, wherein the plurality of candidate classifications further includes a fourth classifications corresponding to a person putting at least one inventory item in an item of clothing worn by the person.

Example 42. The computing system of example 41, wherein: the plurality of candidate classifications includes a first subset of one or more classifications not corresponding to suspicious activity and a second subset of one or more classifications corresponding to suspicious activity, the first subset including the second classification and the second subset including the third and fourth classifications; and causing the one or more alert messages to be displayed includes causing a first alert message to be displayed at least partially in response to classifying a first portion of the time series of video frames as one of the second subset of classifications.

Example 43. The computing system of example 42, wherein the instructions further cause the computing system to: receive an additional time series of video frames depicting an additional area of interest in the retail environment; and determine, by classifying different portions of the additional time series of video frames, that at least one inventory item picked up at the display area was not, or will not likely be, checked out, wherein causing the first alert message to be displayed is also in response to determining that the at least one inventory item picked up at the display area was not, or will not likely be, checked out.

Example 44. The computing system of example 42, wherein the instructions further cause the computing system to: receive an additional time series of video frames depicting an additional area of interest in the retail environment; determine, by classifying different portions of the additional time series of video frames, that at least one inventory item picked up at the display area was not, or will not likely be, checked out; and cause a second alert message to be displayed in response to determining that the at least one inventory item picked up at the display area was not, or will not likely be, checked out.

Example 45. The computing system of any one of examples 42-44, wherein the fourth subset of classifications includes one or more of: a classification corresponding to a person walking by the display area without picking up any inventory item; a classification corresponding to a person standing by the display area without picking up any inventory item; or a classification corresponding to a person placing one or more inventory items in the display area.

Example 46. The computing system of any one of examples 42-45, wherein the first subset of classifications includes a classification corresponding to a person being a store employee.

Example 47. The computing system of any one of examples 39-46, wherein classifying the different portions of the time series of video frames includes classifying each video frame of the time series of video frames.

Example 48. The computing system of any one of examples 36-47, wherein the instructions further cause the computing system to: determine, using the convolutional neural network, that an object is obstructing a view of the display area for at least a threshold amount of time; and in response to determining that the object is obstructing the view of the display area for at least the threshold amount of time, cause an obstruction alert message to be displayed.

VI. Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for monitoring and tracking interactions with inventory in a retail environment, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method of monitoring a display area for inventory items in a retail environment, the method comprising: receiving, by one or more processors of a computing system, a time series of video frames depicting an area of interest in the retail environment, wherein the display area is located in the area of interest; detecting, by the one or more processors and using a convolutional neural network to process the time series of video frames, instances of people picking up inventory items from the display area; for each instance of detecting a person picking up one or more inventory items from the display area, determining, by the one or more processors and using the convolutional neural network, additional information including (i) a type of inventory item that the person picked up and (ii) a count of how many inventory items the person picked up: causing the additional information to be stored in a database; and causing, by the one or more processors and based at least in part on the detected instances of people picking up inventory items from the display area, one or more alert messages to be displayed, wherein determining the type of inventory item that the person picked up includes: determining, using the convolutional neural network, coordinates of a specific portion of a video frame corresponding to an area where the person picked up the one or more inventory items; and determining the type of inventory item using the coordinates of the specific portion of the video frame and a planogram that indicates locations in the display area at which specific inventory items are stocked.

2. The method of claim 1, wherein determining the count of how many inventory items the person picked up includes:
   determining a count of how many inventory items remain in the area where the person picked up the one or more inventory items; and
   subtracting the count of how many inventory items remain from a previous count of inventory items in the area where the person picked up the one or more inventory items.

3. The method of claim 1, wherein:
   detecting the instances of people picking up inventory items from the display area includes classifying different portions of the time series of video frames as one of a plurality of candidate classifications;
   the plurality of candidate classifications includes a first classification corresponding to a person picking up at least one inventory item from the display area; and
   detecting each of the instances of people picking up inventory items from the display area includes classifying a corresponding portion of the time series of video frames as the first classification.

4. The method of claim 3, wherein the plurality of candidate classifications further includes:
   a second classification corresponding to a person putting at least one inventory item in an approved conveyance; and
   a third classification corresponding to a person putting at least one inventory item in an unapproved conveyance.

5. The method of claim 4, wherein the plurality of candidate classifications further includes a fourth classifications corresponding to a person putting at least one inventory item in an item of clothing worn by the person.

6. The method of claim 5, wherein:
the plurality of candidate classifications includes a first subset of one or more classifications not corresponding to suspicious activity and a second subset of one or more classifications corresponding to suspicious activity, the first subset including the second classification and the second subset including the third and fourth classifications; and
causing the one or more alert messages to be displayed includes causing a first alert message to be displayed at least partially in response to classifying a first portion of the time series of video frames as one of the second subset of classifications.

7. The method of claim 6, further comprising:
receiving, by the one or more processors, an additional time series of video frames depicting an additional area of interest in the retail environment; and
determining, by the one or more processors classifying different portions of the additional time series of video frames, that at least one inventory item picked up at the display area was not, or will not likely be, checked out,
wherein causing the first alert message to be displayed is also in response to determining that the at least one inventory item picked up at the display area was not, or will not likely be, checked out.

8. The method of claim 6, further comprising:
receiving, by the one or more processors, an additional time series of video frames depicting an additional area of interest in the retail environment;
determining, by the one or more processors classifying different portions of the additional time series of video frames, that at least one inventory item picked up at the display area was not, or will not likely be, checked out; and
causing, by the one or more processors, a second alert message to be displayed in response to determining that the at least one inventory item picked up at the display area was not, or will not likely be, checked out.

9. The method of claim 6, wherein the first subset of classifications includes one or more of:
a classification corresponding to a person walking by the display area without picking up any inventory item;
a classification corresponding to a person standing by the display area without picking up any inventory item; or
a classification corresponding to a person placing one or more inventory items in the display area.

10. The method of claim 6, wherein the first subset of classifications includes a classification corresponding to a person being a store employee.

11. The method of claim 3, wherein classifying the different portions of the time series of video frames includes classifying each video frame of the time series of video frames.

12. A method of monitoring a display area for inventory items in a retail environment, the method comprising:
receiving, by one or more processors of a computing system, a time series of video frames depicting an area of interest in the retail environment, wherein the display area is located in the area of interest; detecting, by the one or more processors and using a convolutional neural network to process the time series of video frames, instances of people picking up inventory items from the display area; for each instance of detecting a person picking up one or more inventory items from the display area, determining, by the one or more processors and using the convolutional neural network, additional information including (i) a type of inventory item that the person picked up and (ii) a count of how many inventory items the person picked up; causing the additional information to be stored in a database; causing, by the one or more processors and based at least in part on the detected instances of people picking up inventory items from the display area, one or more alert messages to be displayed; determining, by the one or more processors and using the convolutional neural network, that an object is obstructing a view of the display area for at least a threshold amount of time; and in response to determining that the object is obstructing the view of the display area for at least the threshold amount of time, causing, by the one or more processors, an obstruction alert message to be displayed.

13. A computing system comprising: one or more processors; and memory storing instructions that, when executed by the one or more processors, cause the computing system to receive a time series of video frames depicting an area of interest in a retail environment, wherein a display area is located in the area of interest, detect, using a convolutional neural network to process the time series of video frames, instances of people picking up inventory items from the display area, for each instance of detecting a person picking up one or more inventory items from the display area, determine, using the convolutional neural network, additional information including (i) a type of inventory item that the person picked up and (ii) a count of how many inventory items the person picked up, cause the additional information to be stored in a database, and cause, based at least in part on the detected instances of people picking up inventory items from the display area, one or more alert messages to be displayed, wherein determining the type of inventory item that the person picked up includes: determining, using the convolutional neural network, coordinates of a specific portion of a video frame corresponding to an area where the person picked up the one or more inventory items; and determining the type of inventory item using the coordinates of the specific portion of the video frame and a planogram that indicates locations in the display area at which specific inventory items are stocked.

14. The computing system of claim 13, wherein determining the count of how many inventory items the person picked up includes:
determining a count of how many inventory items remain in the area where the person picked up the one or more inventory items; and
subtracting the count of how many inventory items remain from a previous count of inventory items in the area where the person picked up the one or more inventory items.

15. The computing system of claim 13, wherein:
detecting the instances of people picking up inventory items from the display area includes classifying different portions of the time series of video frames as one of a plurality of candidate classifications;
the plurality of candidate classifications includes a first classification corresponding to a person picking up at least one inventory item from the display area; and
detecting each of the instances of people picking up inventory items from the display area includes classifying a corresponding portion of the time series of video frames as the first classification.

16. The computing system of claim 15, wherein the plurality of candidate classifications further includes:
   a second classification corresponding to a person putting at least one inventory item in an approved conveyance; and
   a third classification corresponding to a person putting at least one inventory item in an unapproved conveyance.

17. The computing system of claim 16, wherein the plurality of candidate classifications further includes a fourth classifications corresponding to a person putting at least one inventory item in an item of clothing worn by the person.

18. The computing system of claim 17, wherein:
   the plurality of candidate classifications includes a first subset of one or more classifications not corresponding to suspicious activity and a second subset of one or more classifications corresponding to suspicious activity, the first subset including the second classification and the second subset including the third and fourth classifications; and
   causing the one or more alert messages to be displayed includes causing a first alert message to be displayed at least partially in response to classifying a first portion of the time series of video frames as one of the second subset of classifications.

19. The computing system of claim 18, wherein the instructions further cause the computing system to:
   receive an additional time series of video frames depicting an additional area of interest in the retail environment; and
   determine, by classifying different portions of the additional time series of video frames, that at least one inventory item picked up at the display area was not, or will not likely be, checked out,
   wherein causing the first alert message to be displayed is also in response to determining that the at least one inventory item picked up at the display area was not, or will not likely be, checked out.

20. The computing system of claim 18, wherein the instructions further cause the computing system to:
   receive an additional time series of video frames depicting an additional area of interest in the retail environment;
   determine, by classifying different portions of the additional time series of video frames, that at least one inventory item picked up at the display area was not, or will not likely be, checked out; and
   cause a second alert message to be displayed in response to determining that the at least one inventory item picked up at the display area was not, or will not likely be, checked out.

21. The computing system of claim 18, wherein the fourth subset of classifications includes one or more of:
   a classification corresponding to a person walking by the display area without picking up any inventory item;
   a classification corresponding to a person standing by the display area without picking up any inventory item; or
   a classification corresponding to a person placing one or more inventory items in the display area.

22. The computing system of claim 18, wherein the first subset of classifications includes a classification corresponding to a person being a store employee.

23. The computing system of claim 15, wherein classifying the different portions of the time series of video frames includes classifying each video frame of the time series of video frames.

24. A computing system comprising: one or more processors; and memory storing instructions that, when executed by the one or more processors, cause the computing system to receive a time series of video frames depicting an area of interest in a retail environment, wherein a display area is located in the area of interest, detect, using a convolutional neural network to process the time series of video frames, instances of people picking up inventory items from the display area, for each instance of detecting a person picking up one or more inventory items from the display area, determine, using the convolutional neural network, additional information including (i) a type of inventory item that the person picked up and (ii) a count of how many inventory items the person picked up, cause the additional information to be stored in a database, cause, based at least in part on the detected instances of people picking up inventory items from the display area, one or more alert messages to be displayed, determine, using the convolutional neural network, that an object is obstructing a view of the display area for at least a threshold amount of time, and in response to determining that the object is obstructing the view of the display area for at least the threshold amount of time, cause an obstruction alert message to be displayed.

* * * * *

UNITED STATES PATENT AND TRADEMARK OFFICE
CERTIFICATE OF CORRECTION

| | | |
|---|---|---|
| PATENT NO. | : 11,308,775 B1 | Page 1 of 1 |
| APPLICATION NO. | : 17/401498 | |
| DATED | : April 19, 2022 | |
| INVENTOR(S) | : Somnath Sinha et al. | |

It is certified that error appears in the above-identified patent and that said Letters Patent is hereby corrected as shown below:

In the Claims

At Column 26, Line 26, "up:" should be -- up; --.

Signed and Sealed this
Fifteenth Day of November, 2022

Katherine Kelly Vidal
*Director of the United States Patent and Trademark Office*